(12) United States Patent
Hayashi et al.

(10) Patent No.: US 8,554,706 B2
(45) Date of Patent: Oct. 8, 2013

(54) POWER PLANT CONTROL DEVICE WHICH USES A MODEL, A LEARNING SIGNAL, A CORRECTION SIGNAL, AND A MANIPULATION SIGNAL

(75) Inventors: Yoshiharu Hayashi, Hitachinaka (JP); Akihiro Yamada, Naka-gun (JP); Takaaki Sekiai, Hitachi (JP); Satoru Shimizu, Hitachi (JP); Masayuki Fukai, Hitachi (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 13/415,876

(22) Filed: Mar. 9, 2012

(65) Prior Publication Data

US 2012/0166375 A1    Jun. 28, 2012

Related U.S. Application Data

(62) Division of application No. 12/274,659, filed on Nov. 20, 2008, now Pat. No. 8,135,653.

(30) Foreign Application Priority Data

Nov. 20, 2007 (JP) ................................. 2007-300221
Feb. 25, 2008 (JP) ................................. 2008-042796

(51) Int. Cl.
  *G06E 1/00* (2006.01)
  *G05B 13/02* (2006.01)
(52) U.S. Cl.
  CPC .................................. *G05B 13/027* (2013.01)
  USPC ........................................................ 706/16
(58) Field of Classification Search
  USPC ............. 706/12, 45–48; 73/1.01, 1.02, 1.06, 73/19.01, 23.2, 23.31, 23.32, 23.33; 703/1; 702/1, 85, 98, 99, 104, 24
  See application file for complete search history.

(56) References Cited

U.S. PATENT DOCUMENTS

| 5,249,954 A | 10/1993 | Allen et al. |
| 6,529,887 B1 | 3/2003 | Doya et al. |

(Continued)

FOREIGN PATENT DOCUMENTS

| JP | 04-299704 | 10/1992 |
| JP | 06-242804 | 9/1994 |

(Continued)

OTHER PUBLICATIONS

U.S. Appl. No. 12/132,639, filed Jun. 4, 2008, Eguchi et al.

(Continued)

*Primary Examiner* — David Vincent
(74) *Attorney, Agent, or Firm* — Antonelli, Terry, Stout & Kraus, LLP.

(57) ABSTRACT

A gas concentration estimation device of a coal-burning boiler adapted to estimate the concentration of the gas component included in an exhaust gas emitted from a coal-burning boiler using a neural network, including: a process database section adapted to store process data of a coal-burning boiler; a filtering processing section adapted to perform filtering processing for extracting data suitable for learning of a neural network from the process data stored in the process database section; a neural-network learning processing section adapted to perform learning processing of the neural network based on the data extracted by the filtering processing section and suitable for learning of the neural network; and a neural-network estimation processing section adapted to perform estimation processing of the CO concentration or the NOx concentration in the exhaust gas emitted from the coal-burning boiler based on the learning processing of the neural-network learning processing section.

3 Claims, 15 Drawing Sheets

(56) References Cited

U.S. PATENT DOCUMENTS

| | | |
|---|---|---|
| 7,123,971 B2 | 10/2006 | Piche |
| 7,136,716 B2 | 11/2006 | Hsiung et al. |
| 7,305,282 B2 | 12/2007 | Chen |
| 2006/0178762 A1* | 8/2006 | Wroblewski et al. ............ 700/30 |
| 2006/0224534 A1* | 10/2006 | Hartman et al. ................. 706/15 |
| 2007/0142975 A1 | 6/2007 | Piche |
| 2007/0156288 A1 | 7/2007 | Wroblewski et al. |
| 2007/0174222 A1* | 7/2007 | Daneau et al. ................... 706/19 |
| 2007/0203862 A1 | 8/2007 | Sekiai et al. |
| 2007/0234781 A1 | 10/2007 | Yamada et al. |
| 2007/0250215 A1 | 10/2007 | Jia et al. |
| 2008/0004904 A1* | 1/2008 | Tran ................................. 705/2 |
| 2008/0104101 A1 | 5/2008 | Kirshenbaum et al. |
| 2008/0306890 A1 | 12/2008 | Eguchi et al. |
| 2009/0240636 A1 | 9/2009 | Hofmann et al. |

FOREIGN PATENT DOCUMENTS

| | | |
|---|---|---|
| JP | 07-168799 | 7/1995 |
| JP | 09-101803 | 4/1997 |
| JP | 10-254504 | 9/1998 |
| JP | 10-283334 | 10/1998 |
| JP | 2000-35956 | 2/2000 |
| JP | 2007-233634 | 9/2007 |
| JP | 2007-241624 | 9/2007 |
| JP | 2007-264796 | 10/2007 |
| JP | 2007-265212 | 10/2007 |
| JP | 2007-271187 | 10/2007 |
| JP | 2007-272361 | 10/2007 |
| JP | 2007-272498 | 10/2007 |
| JP | 2007-272646 | 10/2007 |
| JP | 2008-146371 | 6/2008 |
| JP | 2008-171152 | 7/2008 |
| JP | 2008-180481 | 8/2008 |

OTHER PUBLICATIONS

Sutton et al., "Reinforcement Learning", Morikita Publishing Co., Ltd., paragraph142-172 and 247-253, Dec. 2000. Joint translator: Sadayoshi Mikami and Masaaki Minagawa.

* cited by examiner

<PATTERN 1>

<PATTERN 2>

●: DEVIATION PEAKS

NUMBER OF DEVIATION PEAKS IN MODEL: 0(EVEN NUMBER)

NUMBER OF DEVIATION PEAKS IN MODEL: 1(ODD NUMBER)

NUMBER OF DEVIATION PEAKS IN MODEL: 0(EVEN NUMBER)

NUMBER OF DEVIATION PEAKS IN MODEL: 1(ODD NUMBER)

NUMBER OF DEVIATION PEAKS IN MODEL: 0(EVEN NUMBER)

NUMBER OF DEVIATION PEAKS IN MODEL: 1(ODD NUMBER)

FIG. 9A
BURNER PATTERN
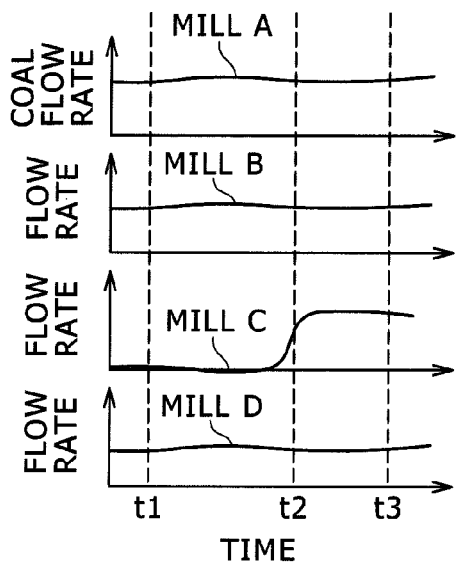
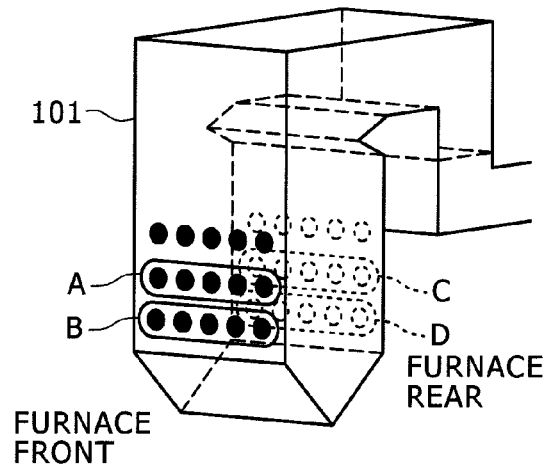
FIG. 9B
LOAD LEVEL
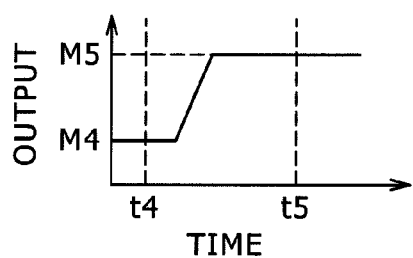
FIG. 9C
COAL TYPE
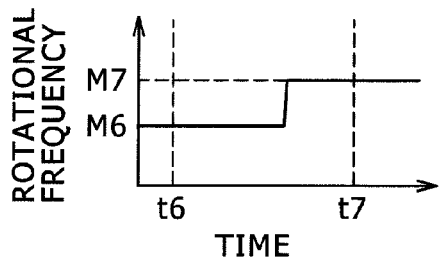

FIG. 11A  MODEL CHARACTERISTICS
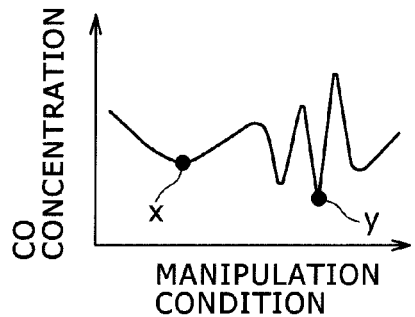
FIG. 11B  CONTROL CIRCUIT
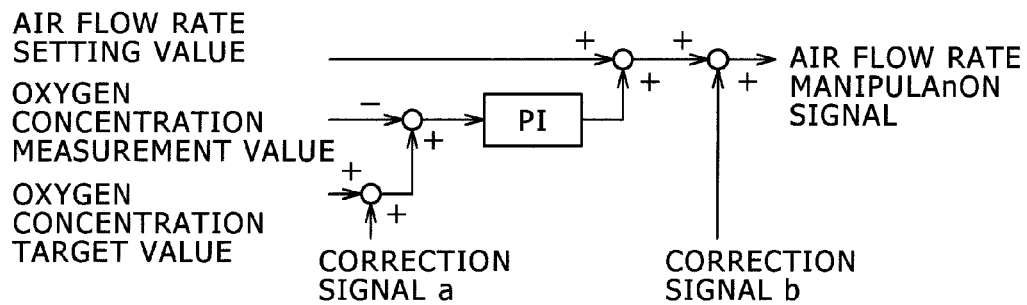
FIG. 11C  MANIPULATION SIGNAL CORRECTION
| | CHARACTERISTIC OF ERROR | CAUSE OF ERROR | CORRECTIONAL METHOD |
|---|---|---|---|
| 1 | | | |
| 2 | | | |
| ⋮ | ⋮ | ⋮ | ⋮ |
FIG. 11D  AFTER-AIR PORT
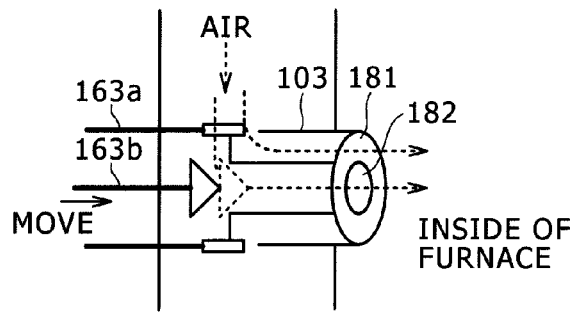

POWER PLANT CONTROL DEVICE WHICH USES A MODEL, A LEARNING SIGNAL, A CORRECTION SIGNAL, AND A MANIPULATION SIGNAL

CROSS REFERENCE TO RELATED APPLICATION

This is a continuation of U.S. application Ser. No. 12/274,659, filed Nov. 20, 2008. This application relates to and claims priority from Japanese Patent Application No. 2007-300221, filed on Nov. 20, 2007 and No. 2008-042796, filed on Feb. 25, 2008. The entirety of the contents and subject matter of all of the above is incorporated herein by reference.

BACKGROUND OF THE INVENTION

1. Field of the Invention

The present invention relates to a control device for a plant, and a control device for a thermal power plant adapted to control a thermal power plant equipped with a boiler.

Further, the present invention relates to a gas concentration estimation device and a gas concentration estimation method of a coal-burning boiler provided to the thermal power plant, and in particular to a gas concentration estimation device and a gas concentration estimation method of a coal-burning boiler adapted to estimate the concentrations of CO and NOx as gas components included in the exhaust gas emitted from the coal-burning boiler.

2. Description of the Related Art

In general, a control device for controlling a plant processes a measurement signal obtained from the plant as a controlled object, and calculates a manipulation signal to be applied to the controlled object to output as a control signal.

The control device for a plant is provided with an algorithm for calculating the manipulation signal so that the measurement signal of the plant satisfies the target value.

As a control algorithm used for the control of a plant, there is cited a proportional-and-integral (PI) control algorithm.

In the PI control, the manipulation signal to be applied to the controlled object is obtained by adding a value obtained by temporally integrating deviation of the measurement value of the plant from the target value thereof to a value obtained by multiplying the deviation by a proportional gain.

Since the control algorithm using the PI control can describe the input-output relationship with a block diagram and so on, the cause-and-effect relationship can easily be understood. Further, the PI control is a stable and safe control algorithm in plant control, and therefore, has a lot of records of application to actual equipment.

However, in the case in which the plant is operated in an unexpected condition such as a change in the operation mode of the plant or a change in the environment, some operation such as modification of the control logic is required in some cases.

Incidentally, adaptive control for automatically correcting and modifying the control method in accordance with a change in the operation mode of the plant or a change in the environment is also available.

As a plant control method using a learning algorithm as one of the adaptive control methods, there can be cited a technology described in JP-A-2000-35956, for example.

In the plant control method using the learning algorithm as the technology described in JP-A-2000-35956, the control device is provided with a model for estimating the characteristic of the controlled object, and a learning section for learning a method of generating a model input with which a model output achieves the target value thereof.

Further, as a learning algorithm, a document "Reinforcement Learning" (joint translator: Sadayoshi Mikami and Masaaki Minagawa, Morikita Publishing Co., Ltd., published: Dec. 20, 2000, paragraph 142-172 and 247-253) describes a method of providing a positive evaluation value when the measurement signal achieves the operation target value, and learning a method of generating a manipulation signal using an algorithm such as Actor-Critic, Q-learning, or Real-Time Dynamic Programming based on the evaluation value.

Further, in thermal power plans equipped with a coal-burning boiler, which uses coal as fuel, the concentrations of CO and NOx, which are environmental pollutants included in the exhaust gas emitted from the coal-burning boiler, are required to be suppressed to be lower than the respective regulation values.

The amounts of production of CO and NOx included in the exhaust gas of the coal-burning boiler correlate inversely with each other, and when burning coal in the coal-burning boiler, if the air (oxygen) for combustion is excessively supplied, the amount of production of NOx increases, and if the air supply is insufficient to the contrary, the amount of production of CO increases.

In recent coal-burning boilers, in order for reducing the amounts of production of both of CO and NOx and at the same time improving the combustion efficiency of the coal-burning boilers, there is adopted a two-stage combustion system in which the combustion air is fed in the coal-burning boiler in stages.

In the combustion control by the two-stage combustion system, an adjustment of the amount of combustion air supplied to the coal-burning boiler, selection of a combustion pattern of a burner provided to the coal-burning boiler, and so on are performed to create the optimum combustion condition of the coal-burning boiler.

Further, the adjustment (e.g., an adjustment of a control gain, planning of the burner combustion pattern) for optimizing the combustion control has previously been executed off-line.

It should be noted that the combustion conditions thus adjusted previously are optimized with respect to a typical operation mode, and nothing more than a rough operation plan.

Further, since the characteristic of the coal-burning boiler as a plant is varied by age deterioration, the optimum combustion conditions at the time when the operation of the coal-burning boiler starts are gradually shifted from the actual optimum combustion conditions across the ages.

On the other hand, it is required from an economic viewpoint to perform optimization (to maximizing the combustion efficiency while suppressing the concentrations of CO and NOx within allowable ranges) of the operation of coal-burning boilers in accordance with ever-changing operation conditions such as load requirement values and age deterioration.

In order for realizing the optimization of the operation of coal-burning boilers, it is required that the variation in the concentrations of CO and NOx in the exhaust gas responsive to a change in a control demand based on the present operation conditions can be simulated on-line.

Specifically, there is required a function of evaluating the combustion efficiency of the coal-burning boiler and amounts of emission of environmental-load materials in the case in which the control demand is changed with respect to the present operation conditions of the coal-burning boiler obtained from measurement data, and searching the optimum control point in view of the both points.

There are several methods for estimating the concentrations of CO and NOx in the exhaust gas emitted from coal-burning boilers, and a method of modeling the relationship between each of the operation conditions and variation trend of the gas concentrations using the data of actual equipment based on a learning algorithm such as a neural network is available.

For example, JP-A-2007-264796 discloses, with respect to creation of a continuous model for simulating the characteristic of a plant used for controlling a boiler, a control method of creating the continuous model based on process data of the boiler, creating the continuous model again using mechanically analyzed process data and operation data of the actual equipment, performing reinforcement learning using the continuous model thus created again to control the boiler, thereby reducing the environmental-load materials in the exhaust gas. Further, it is suggested that a neural network is used for creating the continuous model.

In the case of such a modeling method, by providing actual equipment data, estimation models of the CO concentration and the NOx concentration corresponding to the characteristic of the actual equipment can easily be created. In other words, since even after the operation of the coal-burning boiler is started, the estimation models suitable for the state can be created by using the data of the actual equipment in operation, such a modeling method is used frequently.

In applying the plant control technology using the learning algorithm described in JP-A-2000-35956 to the plant control, if the model for predicting the characteristic of the plant as a controlled object and the characteristic of the actual plant do not match each other, there is caused a difference between the predicted value of the model and the actual measurement value of the plant.

Therefore, even if the manipulation conditions are optimum in the predicted value of the model, the manipulation conditions are not optimum for the actual plant, and consequently, the plant cannot properly controlled with these manipulation conditions.

As a plant control method capable of avoiding the phenomenon described above, there can be cited a method of correcting the model using the measurement value of the actual plant so as to match the actual plant characteristic and the characteristic of the model with each other.

However, according to the method described above, it requires a long period of time to accumulate the measurement data of the actual plant necessary for correcting the model, moreover, the expected control performance is not exerted during the period for accumulating the data.

The technology for appropriately coping with the case in which the characteristics of model and the actual plant do not match each other is not at all described in JP-A-2000-35956.

An object of the present invention as an embodiment is to provide a control device for a plant and a control device for a thermal power plant each capable of preferably maintaining the control characteristic of the plant even in the case in which the characteristic of the model for predicting the characteristic of the plant as a controlled object is different from the characteristic of the actual plant.

The actual equipment data as the measurement value of the coal-burning boiler includes transitional states in changing the operation conditions such as the output. In this case, correlation between the measurement values corresponds to a temporary state, and therefore, shows a state different from the correlation after the state of the plant is settled with elapse of time.

In the case in which it is attempted to model the dynamic characteristic of the plant using the neural network suggested in JP-A-2007-264796, it is effective to perform the learning of the neural network using such actual equipment data.

However, in the case in which it is attempted to learn the static characteristic of the plant, an error is caused in modeling by using such actual equipment data including the transitional state to the learning. Further, in general, measurement values of the plant include a measurement error.

For example, although the temperature or the like can be measured with high accuracy, the flow rate or the like is apt to include a measurement error. Further, the age deterioration in sensors also cause a measurement error. Therefore, there are mixed data with high accuracy and data with low accuracy including a large error in the actual equipment data.

If the learning of the neural network is performed using the actual equipment data including such data with low accuracy mixed thereto, the model of the neural network thus constructed also has low accuracy.

As a result, in the case in which the estimation model of the concentrations of CO and NOx included in the exhaust gas emitted from the coal-burning boiler as a controlled object by learning the trend of the actual equipment data using the actual equipment data including the data with low accuracy mixed thereto, there arises a problem that the estimation accuracy of the model thus constructed becomes lowered.

An object of the present invention as another embodiment is to provide a gas concentration estimation device of a coal-burning boiler and a gas concentration estimation method each suppressing an estimation error of a neural-network model caused by a measurement error included in actual equipment data in the case in which the variation in the concentration of CO or the concentration of NOx in the exhaust gas is simulated using a neural network in combustion control of the coal-burning boiler, thereby making it possible to estimate the gas concentration with high accuracy.

SUMMARY OF THE INVENTION

A control device for a plant according to an embodiment of the present invention is adapted to calculate a manipulation signal for controlling a plant using a measurement signal obtained by measuring an operation state of the plant, includes manipulation signal generation means for generating the manipulation signal to be transmitted to the plant, a model adapted to simulate a characteristic of the plant, learning means for generating an input signal of the model so that an output signal obtained by the model simulating the characteristic of the plant satisfies a predetermined target, learning signal generation means for calculating a learning signal in accordance with a learning result in the learning means, manipulation result evaluation means for calculating a first deviation as a deviation between a first measurement signal of the plant obtained as a result of application of a certain manipulation signal to the plant and a target value of the measurement signal, and a second deviation as a deviation between a second measurement signal of the plant obtained as a result of application of an updated manipulation signal to the plant and the target value, and correction signal generation means for generating, when the second deviation calculated by the manipulation result evaluation means is greater than the first deviation, a correction signal of the manipulation signal to be generated by the manipulation signal generation means, and the correction signal generation means is configured to calculate the correction signal based on a characteristic variable of a model characteristic extracted from the model, and the manipulation signal generation means is configured to calculate the manipulation signal for controlling the plant using at least the learning signal calculated by the learning signal generation means and the correction signal calculated by the correction signal generation means.

A control device for a thermal power plant according to another embodiment of the invention is adapted to calculate a manipulation signal for controlling a thermal power plant using a measurement signal obtained by measuring an operation state of the thermal power plant, the measurement signal including at least one of the concentration of nitrogen oxide, the concentration of carbon monoxide, the concentration of carbon dioxide, the concentration of sulfur oxide, and the concentration of mercury in an exhaust gas emitted from a boiler of the thermal power plant, a flow rate of coal, a rotational frequency of a classification machine of a mill, and a generator output, the manipulation signal including at least one of opening of an air damper, an air flow rate, an air temperature, a fuel flow rate, and an exhaust gas recirculation flow rate of the boiler, and the control device includes manipulation signal generation means for generating the manipulation signal to be transmitted to the thermal power plant, a model adapted to simulate a characteristic of the thermal power plant, learning means for generating an input signal of the model so that an output signal obtained by the model simulating the characteristic of the plant satisfies a predetermined target, learning signal generation means for calculating a learning signal in accordance with a learning result in the learning means, manipulation result evaluation means for calculating a first deviation as a deviation between a first measurement signal of the thermal power plant obtained as a result of application of a certain manipulation signal to the thermal power plant and a target value of the measurement signal, and a second deviation as a deviation between a second measurement signal of the thermal power plant obtained as a result of application of an updated manipulation signal to the thermal power plant and the target value, and correction signal generation means for generating, when the second deviation calculated by the manipulation result evaluation means is greater than the first deviation, a correction signal of the manipulation signal to be generated by the manipulation signal generation means, and the model includes a plurality of models corresponding to each of a burner pattern, a load level, and a coal type of the boiler of the thermal power plant, the manipulation result evaluation means is provided with a function of figuring out the burner pattern based on the value of the measurement signal of a flow rate of the coal supplied to the mill of the boiler, a function of figuring out a load level based on one of an output demand and the value of the measurement signal of the generator output, and a function of figuring out the coal type based on the value of the measurement signal of the rotational frequency of the classification machine of the mill, and the learning signal generation means is configured to generate the learning signal in accordance with the result of learning using the models corresponding respectively to the conditions figured out by the manipulation result evaluation means, and the manipulation signal generation means is configured to calculate the manipulation signal for controlling the thermal power plant using at least the learning signal calculated by the learning signal generation means and the correction signal calculated by the correction signal generation means.

A gas concentration estimation device of a coal-burning boiler according to another embodiment of the present invention is adapted to estimate the concentration of the gas component included in an exhaust gas emitted from a coal-burning boiler using a neural network, includes a process database section adapted to store process data of a coal-burning boiler, a filtering processing section adapted to perform filtering processing for extracting data suitable for learning of a neural network from the process data stored in the process database section, a neural-network learning processing section adapted to perform learning processing of the neural network based on the data extracted by the filtering processing section and suitable for learning of the neural network, and a neural-network estimation processing section adapted to perform estimation processing of the CO concentration or the NOx concentration in the exhaust gas emitted from the coal-burning boiler based on the learning processing of the neural-network learning processing section.

According to the present invention as an embodiment, it is possible to realize a control device for a plant and a control device for a thermal power plant each capable of preferably maintaining the control characteristic of the plant even in the case in which the characteristic of the model for predicting the characteristic of the plant as a controlled object is different from the characteristic of the actual plant.

According to the present invention as another embodiment, it is possible to realize a gas concentration estimation device of a coal-burning boiler and a gas concentration estimation method each suppressing an estimation error of a neural-network model caused by a measurement error included in actual equipment data in the case in which the variation in the concentration of CO or the concentration of NOx in the exhaust gas is simulated using a neural network in combustion control of the coal-burning boiler, thereby making it possible to estimate the gas concentration with high accuracy.

BRIEF DESCRIPTION OF THE DRAWINGS

FIGS. 9A through 9C are explanatory diagrams of discrimination method of plant operation conditions by manipulation result evaluation means in the control device for a thermal power plant as the second embodiment shown in FIG. 7.

FIGS. 11A through 11D are explanatory diagrams of a model and an operation of learning means in the control device for a thermal power plant as the second embodiment shown in FIG. 7.

FIGS. 13A and 3B are schematic diagrams showing an example of a process of drawing a graph in a filtering processing section forming the gas concentration estimation device of the embodiment shown in FIG. 12.

DETAILED DESCRIPTION OF THE INVENTION

Then, a control device for a plant and a control device for a thermal power plant as embodiments of the present invention will be explained with reference to the accompanying drawings.

First Embodiment

Figure 1:
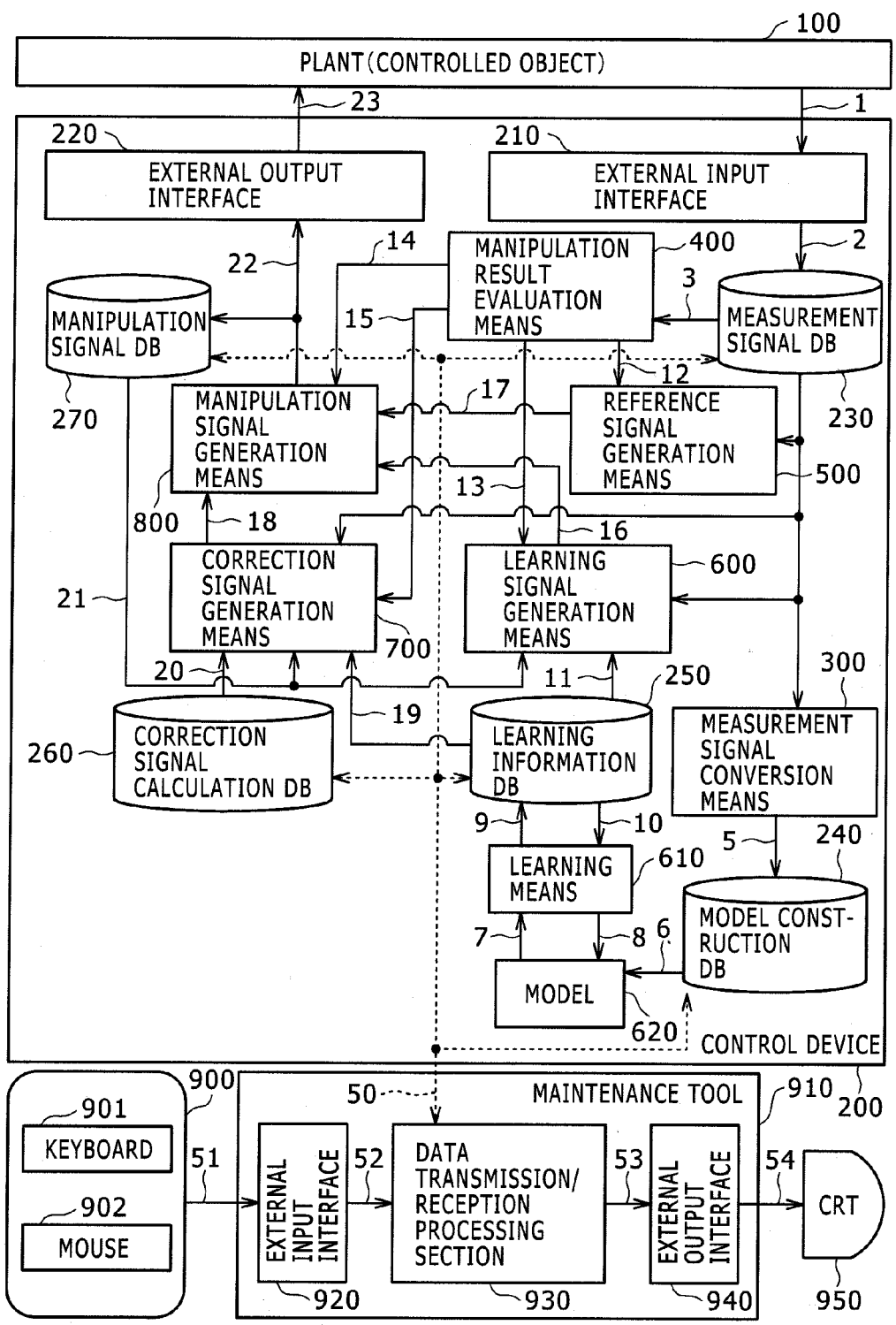
FIG. 1 is a control block diagram showing an overall configuration of a control device for a plant as a first embodiment of the invention.

FIG. 1 is a control block diagram showing an overall configuration of a control device for a plant as a first embodiment of the invention.

In FIG. 1, in the present embodiment, a plant 100 is controlled by a control device 200.

The control device 200 has a configuration provided with measurement signal conversion means 300, manipulation result evaluation means 400, reference signal generation means 500, learning signal generation means 600, learning means 610, a model 620, correction signal generation means 700 and manipulation signal generation means 800 as operational equipment.

Further, the control device 200 is provided with a measurement signal database 230, a model construction database 240, a learning information database 250, a correction signal calculation database 260, and a manipulation signal database 270 as databases.

Further, the control device 200 has an external input interface 210 and an external output interface 220 as interfaces with the outside.

Further, the control device 200 acquires a measurement signal 1 obtained by measuring various state variables of the plant 100 from the plant 100 via the external input interface 210, and further, the control device 200 outputs, for example, a manipulation signal 23 for controlling a flow rate of an operating fluid supplied thereto to the plant 100 via the external output interface 220.

The measurement signal 1 of the various state variables of the plant 100 acquired to the control device 200 from the plant 100 is stored in the measurement signal database 230 as the database provided to the control device 200 as a measurement signal 2 via the external input interface 210.

A manipulation signal 22 generated by the manipulation signal generation means 800 as the operational equipment provided to the control device 200 is transmitted from the manipulation signal generation means 800 to the external output interface 220, and at the same time, stored in the manipulation signal database 270 as the database provided to the control device 200.

Further, in the manipulation result evaluation means 400 as the operational equipment provided to the control device 200, flags 12, 13, 14, and 15 are calculated using a measurement signal 3 stored in the measurement signal database.

The flags 12, 13, 14, and 15 calculated by the manipulation result evaluation means 400 are transmitted respectively to the reference signal generation means 500, the learning signal generation means 600, the correction signal generation means 700, and the manipulation signal generation means 800 as the operational equipment provided to the control device 200.

The reference signal generation means 500, the learning signal generation means 600, the correction signal generation means 700, and the manipulation signal generation means 800 determine whether or not the operations thereof should be executed (e.g., they do not execute their operations if the value of the flag is 0, while they execute their operations if the value of the flag is 1) based on the values of the flags 12, 13, 14, and 15 thus transmitted, respectively.

It should be noted that the method of determining the values of the flags will be described later using FIG. 3.

The manipulation signal generation means 800 as the operational equipment provided to the control device 200 calculates the manipulation signal 22 using a reference signal 17 generated by the reference signal generation means 500, a learning signal 16 generated by the learning signal generation means 600, and a correction signal 18 generated by the correction signal generation means 700.

The reference signal generation means 500 as the operational equipment provided to the control device 200 calculates the reference signal 17 using a measurement signal 4 stored in the measurement signal database 230.

The reference signal generation means 500 is composed of a proportional-and-integral control (PI control) circuit and so on, and is arranged to calculate the reference signal 17 based on a previously designed logic.

The learning signal calculation means 600 as the operational equipment provided to the control device 200 calculates a learning signal 16 using the measurement signal 4 stored in the measurement signal database 230, a manipulation signal 21 stored in the manipulation signal database 270, and learning information data 11 stored in the learning information database 250.

The learning information data 11 stored in the learning information database 250 is generated using learning information data 9 from the learning means 610 and a model output 7 from the model 620.

The model 620 as the operational equipment provided to the control device 200 has a function of simulating the control characteristic of the plant 100 using a statistical model and a physical model built inside thereof.

The manipulation signal 23 generated in the control device 200 is provided to the plant via the external output interface 220, and the measurement signal 1 of the plant 100 as a control result is received by the control device 200 via the external input interface 210.

The learning means 610 and the model 620 are made to operate in combination, thereby simulating these conditions, and these conditions are output as the model output 7.

Specifically, a model input 8 generated by the learning means is provided to the model 620, and the learning means 610 receives the model output 7 as the control result.

The model 620 calculates the model output 7 corresponding to the model input 8 input from the learning means 610 using model construction data 6 stored in the model construction database 240, and then outputs the model output 7.

The model 620 is built with the statistical model such as a neural network and the physical model of the plant 100.

The model construction database 240 stores actual equipment data 5 generated by removing a noise included in the measurement signal 4 output from the measurement signal database 230 by the measurement signal conversion means 300, and the model construction data 6 such as a model parameter required to build the model 620.

The learning means 610 as the operational equipment provided to the control device 200 learns a method of generating the model input 8 with which the model output 7 calculated by the model 620 becomes a desired value.

The parameters used for learning such as a target value of the model output 7 are stored in the learning information database 250, and the learning is performed by the learning means 610 using learning information data 10 thus stored therein.

As a method of implementing the learning means 610, the reinforcement learning can be cited. In the reinforcement learning, the model input 8 is generated in a trial-and-error manner in the early stage thereof.

The learning means 610 becomes to be able to generate the model input 8 with which the model output 7 calculated by the model 620 becomes the desired value as it proceeds with the learning thereafter.

As such a learning algorithm, the document "Reinforcement Learning" described above describes a method of providing a positive evaluation value when the measurement signal achieves the operation target value, and learning a method of generating a manipulation signal using an algorithm such as Actor-Critic, Q-learning, or Real-Time Dynamic Programming based on the evaluation value.

The learning means 610 can adopt various optimization methods such as evolutionary computation besides the reinforcement learning described above.

The information data 9 as the result of learning performed by the learning means 610 is stored in the learning information database 250.

The correction signal generation means 700 as the operational equipment provided to the control device 200 calculates the correction signal 18 using the manipulation signal 21 stored in the manipulation signal database 270, the measurement signal 4 stored in the measurement signal database 230, learning information data 19 stored in the learning information database 250, and correction signal calculation data 20 stored in the correction signal calculation database 260.

The correction signal generation means 700 is configured to have at least one of a function of increasing the value of the manipulation signal, a function of decreasing the value of the manipulation signal, a function of keeping the value of the manipulation signal as it stands, a function of resetting the value of the manipulation signal, and a function of matching the value of the manipulation signal and a predetermined value.

Further, the correction signal generation means 700 is capable of extracting a characteristic variable of the model 620 to calculate the correction signal 18. The operation of the correction signal generation means 700 will be described later in detail.

Further, the correction signal 18 generated by the correction signal generation means 700 is output to the manipulation signal generation means 800 so as to correct the manipulation signal 22 generated by the manipulation signal generation means 800.

The manipulation signal generation means 800 calculates the manipulation signal 22 based on the correction signal 18 input from the correction signal generation means 700 to output the manipulation signal 22 from the control device 200 to the plant 100 via the external output interface 220 as the manipulation signal 23 for controlling, for example, burners of a boiler and an air flow rate of an air port.

Further, as shown in FIG. 1, in the vicinity of the control device 200, there are disposed an external input device 900 composed mainly of a keyboard 901 and a mouse 902, a maintenance tool 910, and an image display device 950.

Further, it is arranged that the operator of the plant 100 generates a maintenance tool input signal 51 using the external input device 900 composed mainly of the keyboard 901 and the mouse 902 to input the maintenance tool input signal 51 to the maintenance tool 910, thereby making it possible to display information of the various databases disposed in the control device 200 on the image display device 950.

The maintenance tool 910 is composed mainly of an external input interface 920, a data transmission and reception processing section 930, and an external output interface 940.

The maintenance tool input signal 51 generated by the external input device 900 is acquired by the maintenance tool 910 via the external input interface 920.

The data transmission and reception section 930 of the maintenance tool 910 is configured to acquire the database information 50 from the various databases disposed in the control device 200 in accordance with the information of a maintenance tool input signal 52.

The data transmission and reception processing section 930 of the maintenance tool 910 transmits a maintenance tool output signal 53 obtained as a result of processing of the database information 50 to the external output interface 940.

The external output interface 940 transmits an output signal 54 based on the maintenance tool output signal 53 to the image display device 950 so as to display the output signal 54 on the image display device 950.

It should be noted that although in the control device 200 as the embodiment of the present invention described above, the measurement signal database 230, the model construction database 240, the learning information database 250, the correction signal calculation database 260, and the manipulation signal database 270 forming the databases provided to the control device 200, the measurement signal conversion means 300, the manipulation result evaluation means 400, the reference signal generation means 500, the learning signal generation means 600, the learning means 610, the model 620, the correction signal generation means 700, and the manipulation signal generation means 800 are disposed inside the control device 200, it is also possible to dispose all or some of these constituents outside the control device 200.

Figure 2:
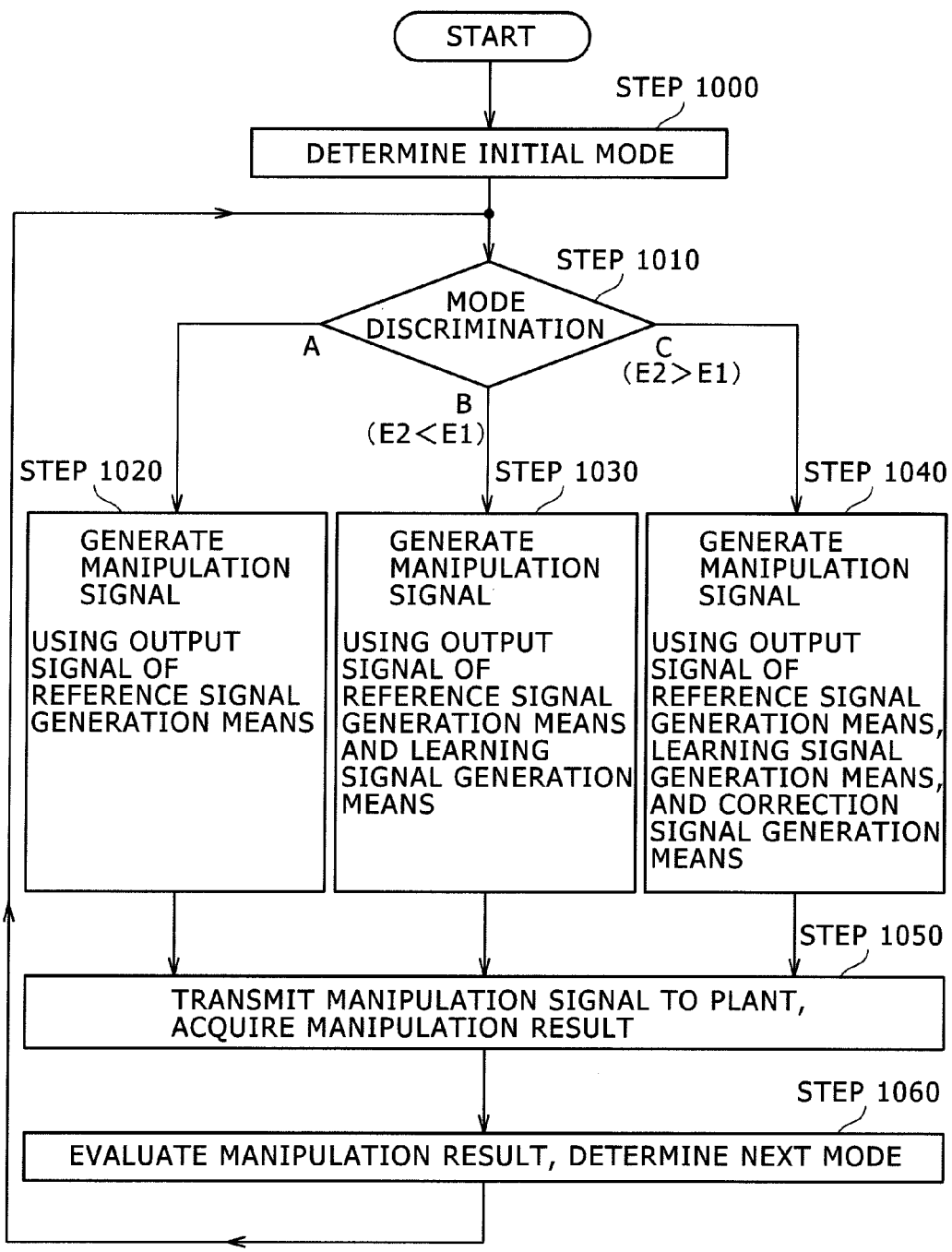
FIG. 2 is a flowchart showing a control procedure in the control device for a plant as the first embodiment shown in FIG. 1.

FIG. 2 is a flowchart showing a control procedure in the control device for a plant as the first embodiment shown in FIG. 1.

In FIG. 2, the control device 200 of the plant 100 performs the control of the plant 100 using the steps 1000, 1010, 1020, 1030, 1040, 1050, and 1060 of the present flowchart in combination.

Further, as shown in FIG. 2, the control device 200 has three operation modes of A, B, and C.

Firstly, an initial mode is determined in the step 1000 of determining the initial mode, and specifically, the initial mode in the present embodiment is set to A.

Therefore, the process proceeds to the mode discrimination step to perform the mode discrimination. Then the process proceeds to the manipulation signal generation step 1020 if the operation mode is mode A, the manipulation signal generation step 1030 if the operation mode is mode B, or the manipulation signal generation step 1040 if the operation mode is mode C, respectively.

In each of the manipulation signal generation steps 1020, 1030, and 1040 to which the process proceeds in accordance with the discrimination result in the mode discrimination step 1010, the manipulation signal generation means 800 provided to the control device 200 is made to operate to generate the manipulation signal 22.

The manipulation result evaluation means 400 provided to the control device 200 operates to create the flags 12, 13, and 15 for making the reference signal generation means 500, the learning signal generation means 600, and the correction signal generation means 700 operate, respectively, according to needs using the measurement signal 3 stored in the measurement signal database.

In the case in which the mode A is set as the initial mode of the drive mode, and the process proceeds to the manipulation signal generation step 1020, the manipulation signal 22 is calculated based on a formula 1 provided to the manipulation signal generation means 800 as an operational function using the reference signal 17 generated by the reference signal generation means 500.

Here, So denotes the manipulation signal, and Sb denotes the reference signal.

$$So = Sb \quad (1)$$

Further, if the drive mode makes the transition to the mode B, and the process proceeds to the manipulation signal generation step 1030, the manipulation signal 22 is calculated based on a formula 2 provided to the manipulation signal generation means 800 as an operational function using the reference signal 17 generated by the reference signal generation means 500 and the learning signal 16 generated by the learning signal generation means 600.

Here, Sl denotes the learning signal.

$$So = Sb + Sl \quad (2)$$

Further, if the drive mode makes the transition to the mode C, and the process proceeds to the manipulation signal generation step 1040, the manipulation signal 22 is calculated based on a formula 3 provided to the manipulation signal generation means 800 as an operational function using the reference signal 17 generated by the reference signal generation means 500, the learning signal 16 generated by the learning signal generation means 600, and the correction signal 18 generated by the correction signal generation means 700. Here, Sr denotes the correction signal.

$$So = Sb + Sl + Sr \quad (3)$$

It should be noted that although the control device 200 of the present embodiment calculates the manipulation signal 22 using the formulas 1 through 3 provided to the manipulation signal generation means 800 as the operational functions, it is also possible to provide the control device 200 with a function of, for example, preventing the manipulation signal So from varying rapidly using a variation rate limiter, or a function of limiting the value of the manipulation signal within a predetermined range using an upper and lower limiter.

In the step 1050 of transmitting the manipulation signal to the plant and receiving the manipulation result to which the process proceeds via either one of the manipulation signal generation steps 1020, 1030, and 1040 to which the process proceeds based on the mode A, B, or C determined in the mode discrimination step, the manipulation signal 22 generated in either one of the manipulation signal generation steps 1020, 1030, and 1040 and transmitted from the manipulation signal generation means 800 is then transmitted to the plant 100 via the external output interface 220 as the manipulation signal 23.

As a result of providing the manipulation signal 23 to the plant 100, the measurement signal 1 as a state variable showing the operation state is then acquired from the plant 100, and stored in the measurement signal database 230 of the control device 200.

In the step 1060 of evaluating the manipulation result and determining the next mode to which the process proceeds via the step 1050, the manipulation result evaluation means 400 provided to the control device 200 evaluates the manipulation result responsive to the manipulation of the plant 100 using the measurement signal 3 stored in the measurement signal database 230, and determines the next mode.

As described above, the initial mode of the drive mode for controlling the plant 100 is the mode A set in the initial mode determination step 1000.

Then, the drive mode makes the transition to the mode B for generating the manipulation signal using the learning result by the learning signal generation means 600 in combination therewith.

In the case in which the drive mode makes the transition to the mode B, the manipulation result evaluation means 400 calculates a first deviation E1 as a deviation of the a measurement signal Sm1 acquired as a result of applying a certain manipulation signal 22a1 to the plant from the target value Sa of the measurement signal Sm1, and a second deviation E2 as a deviation of the second measurement signal Sm2 acquired from the plant 100 as a result of applying an updated manipulation signal 22a2 to the plant 100 from the target value Sa of the measurement signal Sm2 based on formulas 4 and 5 using a first measurement signal Sm1, a second measurement signal Sm2, and the target value Sa.

Here, E1 denotes the first deviation, E2 denotes the second deviation, Sm1 denotes the first measurement signal, Sm2 denotes the second measurement signal, and Sa denotes the target value of the measurement signals.

An average value of a certain period of time or an instantaneous value is user as the measurement signals Sm1, Sm2.

Further, ABS (a) denotes a function for calculating the absolute value of a.

$$E1 = ABS(Sm1 - Sa) \quad (4)$$

$$E2 = ABS(Sm2 - Sa) \quad (5)$$

If the second deviation E2 is larger than the first deviation E1, the drive mode makes the transition to the mode C, and if the second deviation E2 is smaller than the first deviation E1, the drive mode becomes the mode B.

In other words, if the control characteristic becomes worse (the deviation of the measurement signal from the target value increases) as a result of application of the updated manipulation signal to the plant 100, the drive mode makes the transition to the mode C, and the manipulation signal generation means 800 calculates the manipulation signal 22 using the correction signal 18 generated by the correction signal generation means 700.

As described later, the correction signal generation means 700 generates the correction signal 18 so as to maintain the control characteristic in a preferable condition.

As a result, an advantage of improving the control performance of the plant can be obtained.

Further, in the manipulation signal generation step 1040, it is possible to calculate the manipulation signal 22 using the deviations E1, E2 calculated by the formulas 4 and 5 of the operational functions, or based on formulas 6 through 8, besides the method of calculating the manipulation signal 22 using the formula 3 provided to the manipulation signal generation means 800 as the operational function.

It should be noted that α and β denote weighting parameters, and ε denotes a predetermined design parameter.

$$So = Sb + \alpha \times Sl + \beta \times Sr \quad (6)$$

$$\alpha \rarw \alpha - \varepsilon \cdot (E2 - E1) \quad (7)$$

$$\beta \rarw \beta - \varepsilon \cdot (E2 - E1) \quad (8)$$

Here, the formula 6 means that the value of α is updated with the value obtained by subtracting ε·(E2−E1) from the previous value of α.

By calculating the manipulation signal 22 using the formulas 6 through 8 provided to the manipulation signal generation means 800 as the operational functions, the larger the value of E2−E1 is, the larger the value of β as the weighting parameter of the correction signal Sr becomes, and the more significant the influence of the value of the correction signal 18 generated by the correction signal generation means 700 on the manipulation signal 22 generated by the manipulation signal generation means 800 becomes.

Figure 3:
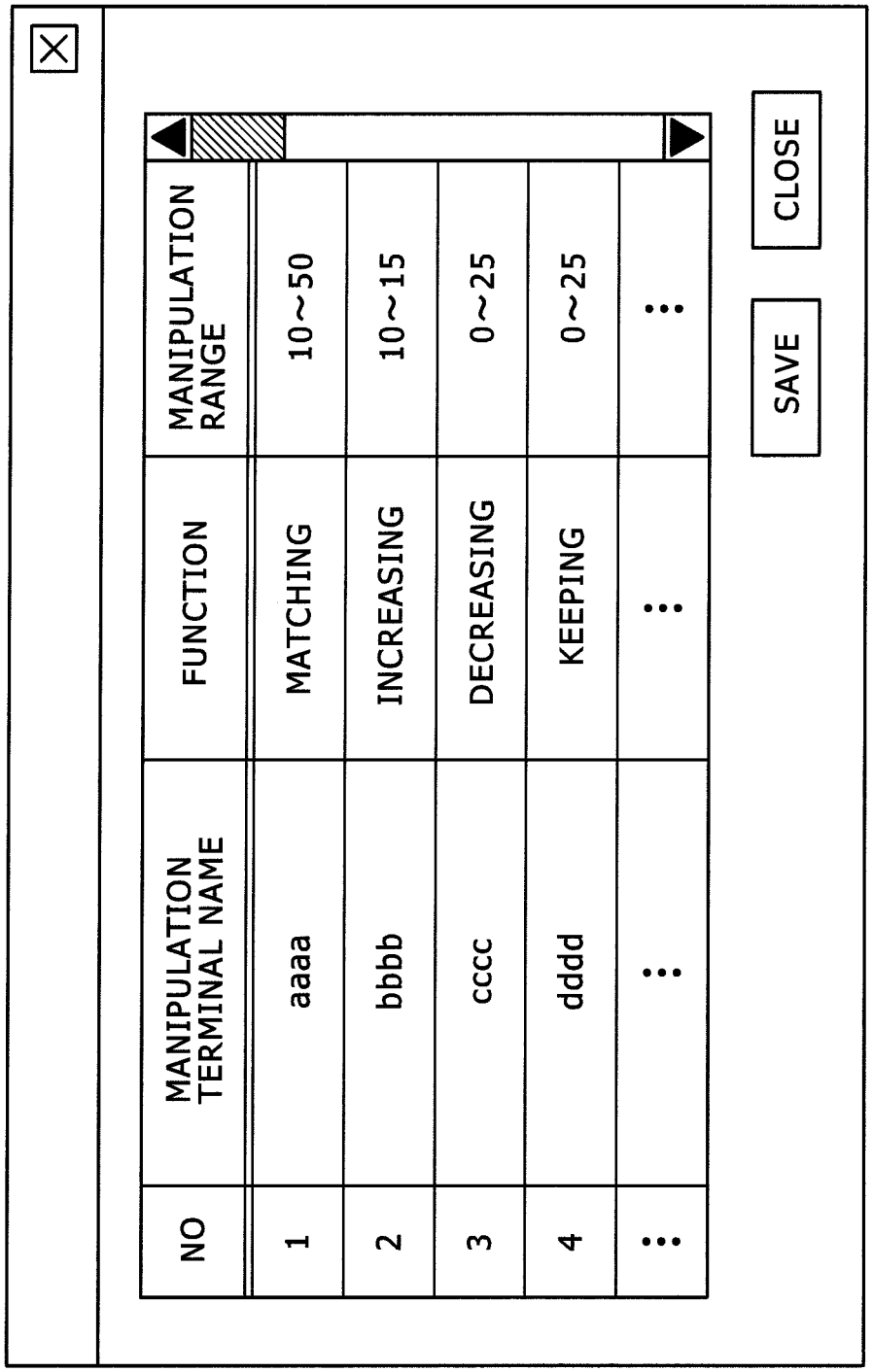
FIG. 3 is a setting screen of information to be stored in a correction signal calculation database in the control device for a plant as the first embodiment shown in FIG. 1.

FIG. 3 is a setting screen of information to be stored in a correction signal calculation database 260 in the control device 200 as the embodiment of the control device for a plant shown in FIG. 1.

Further, the correction signal generation means 700 of the control device 200 calculates the correction signal 18 using the information stored in the correction signal calculation database 260, which is a variety of kinds of information set on the screen shown in FIG. 3.

By using the screen shown in FIG. 3, the operator of the plant 100 can arbitrarily set which one of the following functions is used for every manipulation terminal, namely a function of increasing the value of the manipulation signal, a function of decreasing the value of the manipulation signal, a function of keeping the value of the manipulation signal as it stands, a function of resetting the value of the manipulation signal, a function of matching the value of the manipulation signal and a predetermined value, and a function of calculating the value of the manipulation signal based on the model characteristic variable.

Further, it is also possible to set the manipulation range of the manipulating variable for every manipulation terminal.

As the model characteristic variables, there can be cited model parameters stored in the model construction database 240 of the control device 200, deviation peak information of the model output characteristic curve, and so on.

FIGS. 4A through 4F, 5A, and 5B are diagrams for explaining respective operations of the correction signal generation means 700 provided to the control device 200 as the embodiment of the control device for a plant shown in FIG. 1.

FIGS. 4A through 4D each have the horizontal axis representing the manipulating variable applied to the model or the actual equipment, and the vertical axis representing the controlled variable of the model or the actual equipment, and show an example illustrating the model characteristic and the learning result of the model 620 in the control device 200 of the present embodiment.

It should be noted that FIGS. 4A through 4D show diagrams assuming the case in which the learning means 610 of the control device 200 searches the manipulation condition in which the controlled variable of the model becomes the minimum in the present embodiment.

Figure 4A:
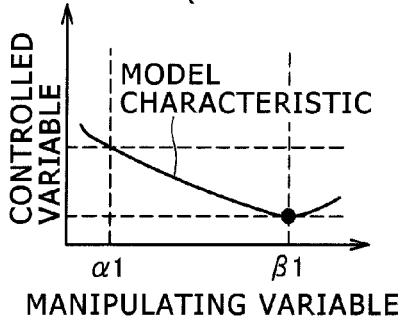
FIGS. 4A through 4F are explanatory diagrams of respective operations of correction signal generation means in the control device for a plant as the first embodiment shown in FIG. 1.

In FIG. 4A, α1 in the horizontal axis represents the present manipulating variable, and β1 represents the manipulating variable after the learning (searching) has been executed.

As shown in FIG. 4A, by changing the manipulating variable from α1 to the manipulating variable β1 after the learning (searching) has been executed, the controlled variable illustrated by the model characteristic curve is reduced on the model 620.

Therefore, if the model characteristic and the plant characteristic of the plant as the actual equipment match each other, by updating the manipulating variable from α1 to β1, the controlled variable of the plant 100 corresponding to the manipulating variable should be reduced.

However, in the case in which the model characteristic and the plant characteristic of the actual equipment do not match each other because of the model error, there is a possibility that the controlled variable of the plant 100 increases to the contrary if the plant 100 is manipulated using the learning result.

Figure 4D:
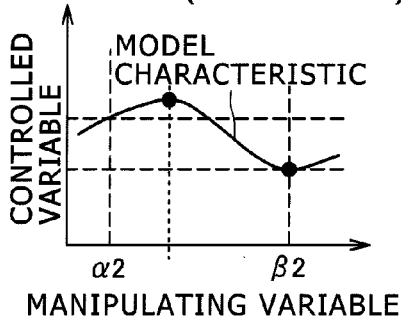
Figure 4B:
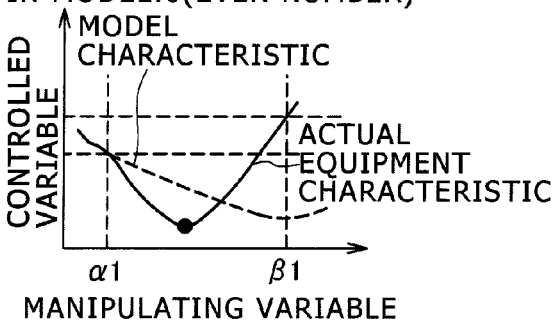

FIG. 4B shows an example in which the model characteristic curve rises to increase the controlled variable of the plant 100 as a result of updating the manipulating variable from α1 to β1, the value after the learning has been performed.

Incidentally, the degradation in the control characteristic caused by the model error can be suppressed by correcting the model using the newly obtained measurement signal 1 of the plant 100 to decrease the model error, and then relearning the manipulation method to the corrected model 620 by the learning means 610 of the control device 200 taking the corrected model 620 as an object.

However, in the case in which this method is used, it often takes a long period of time to accumulate a number of data of the measurement signal 1 for correcting the model 620, and during the period of time for accumulating the data, the expected control performance cannot be exerted.

In particular in the case it is not allowed to operate the plant in a condition with an improper control characteristic for a long period of time, it is difficult to adopt the method described above.

In view of the above circumstances, the correction signal generation means 700 provided to the control device 200 of the present embodiment is for solving the problem of the method described above.

Specifically, in the control device 200 of the present embodiment, if the controlled variable of the plant 100 as the controlled object increases when the manipulating variable to the model 620 is updated from α1 to β1, the drive mode of the control device 200 is switched from the mode A as the initial mode to the mode C (see FIG. 2).

In the mode C thus switched to, the correction signal generation means 700 provided to the control device 200 generates the correction signal 18 for maintaining the preferable control characteristic, and the manipulation signal generation means 800 generates the manipulation signal 22 to be a command signal to the plant 100 as the controlled object based on the correction signal 18.

The correction signal generation means 700 as a function of generating the correction signal 18 using the model characteristic curve shown in FIG. 4A.

Specifically, the correction signal generation means 700 calculates the number of deviation peaks of the model characteristic curve based on the model characteristic curve, and calculates the correction signal 18 based on the number of the deviation peaks.

Then, if the number of the deviation peaks of the model characteristic curve is an even number, the manipulating variable is decreased, and if it is an odd number, the manipulating variable is increased.

The reason that the method described above decreases the controlled variable and make the model characteristic come closer to a desired characteristic will hereinafter be explained with reference to FIGS. 4A through 4F.

Firstly, the case in which the number of the deviation peaks of the model characteristic curve existing between the values .alpha.1 and .beta.1 of the manipulating variable is an even number as shown in FIG. 4A will be explained.

In an example of the model characteristic shown in FIG. 4A, the number of deviation peaks is 0, which is an even number.

In this case, if the deviation peak in the actual equipment characteristic illustrated with the solid line as an actual equipment characteristic curve is located between the values .alpha.1 and .beta.1 of the manipulating variable as shown in FIG. 4B, the controlled variable corresponding to the manipulating variable of .beta.1 becomes larger than the controlled variable corresponding to the manipulating variable of .alpha.1.

Figure 4E:
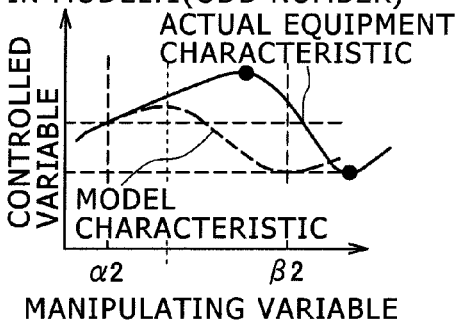
Figure 4C:
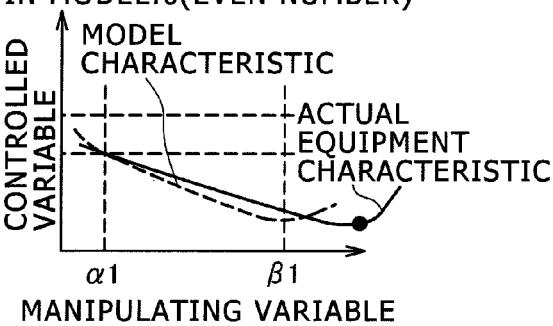

Further, if the deviation peak in the actual equipment characteristic illustrated with the solid line as the actual equipment characteristic curve is located at a position corresponding to a value larger than .beta.1, the situation shown in FIG. 4C appears, the controlled variable corresponding to the manipulating variable of .beta.1 becomes smaller than the controlled variable corresponding to the manipulating variable of .alpha.1.

Here, in the case in which the actual equipment characteristic has the deviation peak between the values .alpha.1 and .beta.1 of the manipulating variable as shown in FIG. 4B, the controlled variable can be reduced by reducing the manipulating variable.

In other words, if the number of deviation peaks of the model characteristic curve illustrated with the broken line is an even number, the controlled variable of the plant 100 can be reduced by reducing the manipulating variable so as to come closer to the value .alpha.1.

Figure 4F:
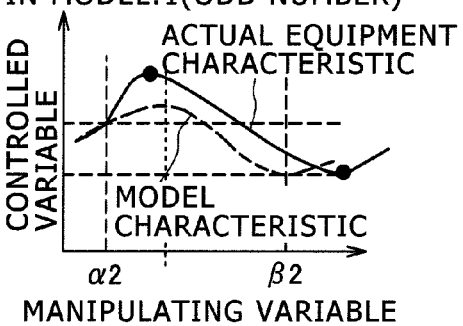

Then, the case in which a model having a different model characteristic curve is used as the model 620, and the number of the deviation peaks of the model characteristic curve existing between the values .alpha.2 and .beta.2 of the manipulating variable is an odd number as shown in FIGS. 4D through 4F will be explained.

In an example shown in FIG. 4D, the number of deviation peaks is 1, which is an odd number.

In this case, as shown in FIG. 4E, if the position of the deviation peak in the actual equipment characteristic curve illustrated with the solid line is shifted from the deviation peak of the model characteristic curve illustrated with the broken line towards the value .beta.2 of the manipulating variable, the controlled variable corresponding to the manipulating variable of .beta.2 becomes larger than the controlled variable corresponding to the manipulating variable of .alpha.2.

Further, in contrast, if the position of the deviation peak in the actual equipment characteristic curve is shifted from the deviation peak of the model characteristic towards the value .alpha.2 of the manipulating variable, the actual equipment characteristic curve becomes as illustrated with the solid line in FIG. 4F, the controlled variable corresponding to the manipulating variable of .beta.2 becomes smaller than the controlled variable corresponding to the manipulating variable of .alpha.2.

According to this fact, in the case in which the actual equipment characteristic is represented by the actual equipment characteristic curve shown in FIG. 4E, the controlled variable corresponding to the manipulating variable can be reduced by increasing the manipulating variable.

In other words, if the number of deviation peaks of the model characteristic curve is an odd number, the controlled variable of the plant 100 can be reduced by increasing the manipulating variable.

It should be noted that in FIGS. 4A through 4F, the case in which the number of the deviation peaks of the model characteristic curve is an even number shown in FIGS. 4A through 4C is described on the left as a pattern 1, and the case in which the number of the deviation peaks of the model characteristic curve is an even number shown in FIGS. 4D through 4F is described on the right as a pattern 2.

Therefore, the correction signal generation means 700 is arranged to generate the correction signal 18 for increasing or decreasing the manipulating variable using the information of the number of deviation peaks of the model characteristic curve described above to output the correction signal to the manipulation signal generation means 800.

Further, by displaying the graphs emphasizing the positions of the deviation peaks of the model characteristic curve as shown in FIGS. 4A and 4D and the number of deviation peaks of the model characteristic curve on the image display device 950 of the maintenance tool 910 attached to the control device 200 shown in FIG. 1, it becomes possible for the operator of the plant 100 to understand the grounds for generation of the correction signal 18 generated by the correction signal generation means 700, and to evaluate the validity of the correction signal 18.

Figure 5B:
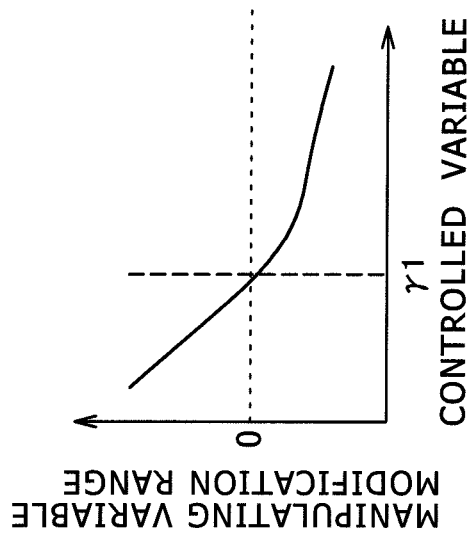
FIGS. 5A and 5B are explanatory diagrams of an operation for learning an optimum manipulation method by the correction signal generation means in the control device for a plant as the first embodiment shown in FIG. 1.
Figure 5A:
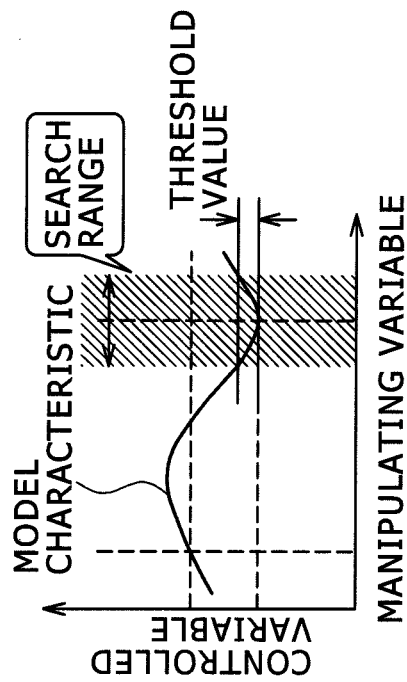

FIGS. 5A and 5B are diagrams for explaining the operation of learning the most appropriate manipulation method directed to the plant 100 by the correction signal generation means 700 in the control device 200 of the present embodiment.

The search range for learning is determined by the learning means 610 and the model 620 of the control device 200 combined with each other.

The learning means 610 sets the predetermined range of threshold value as the range of trial-and-error centering around the manipulation condition with which the deviation between the model output and the target value becomes minimum as in the model characteristic in the case of controlling the plant 100 illustrated with the solid line in FIG. 5A with the horizontal axis representing the manipulating variable and the vertical axis representing the controlled variable.

Further, the correction signal generation means 700 sets the search range of the manipulating variable in which the manipulation signal is varied within the range of trial-and-error determined by the learning means, and calculates the manipulation signal so that the deviation between the measurement signal of the plant 100 and the target value of the measurement signal becomes the minimum.

Then, the learning result by the learning means 610 is stored in the learning information database 250 in a form shown in FIG. 5B, for example.

FIG. 5B means that the correction signal generation means 700 generates the correction signal 18 for reducing the manipulating variable if the controlled variable is larger than yl, or generates the correction signal 18 for increasing the manipulating variable if the controlled variable is smaller than yl.

By displaying the graph of the correction signal shown in FIG. 5B on the image display device 950, it becomes possible for the operator of the plant 100 to understand the grounds for generation of the correction signal 18, and to evaluate the validity of the correction signal 18.

Figure 6:
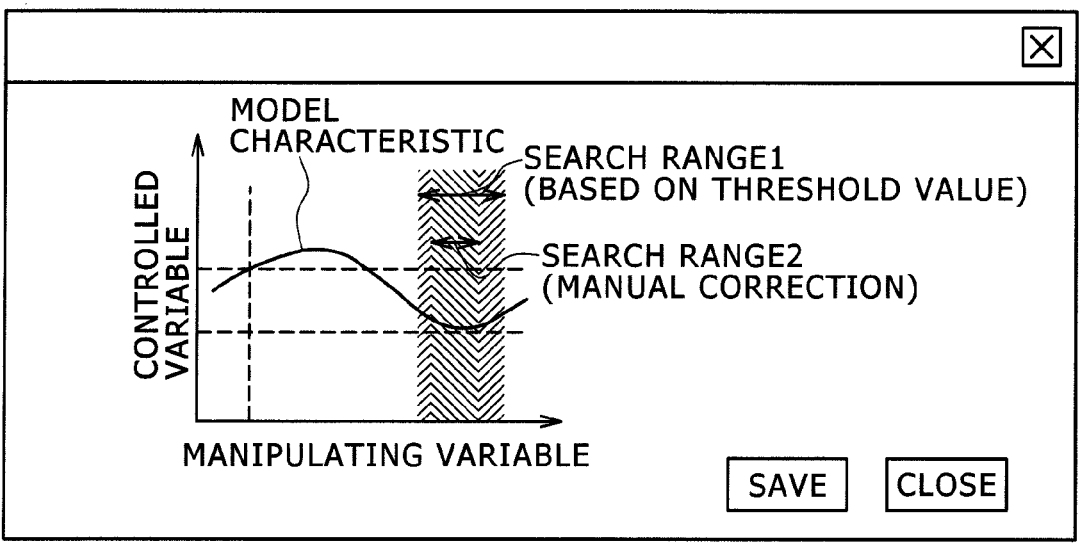
FIG. 6 is an explanatory diagram of an interface for changing a trial-and-error range in the correction signal generation means in the control device for a plant as the first embodiment shown in FIG. 1.

FIG. 6 is a diagram for explaining the interface for changing the range of trial-and-error, in which the manipulation signal is varied, performed by the correction signal generation means 700 provided to the control device 200 of the present embodiment.

Using various kinds of information displayed on the screen shown in FIG. 6, the search range of the manipulating variable explained with reference to FIGS. 5A and 5B can be set manually as shown in the screen shown in FIG. 6 as a search range based on the manual correction in comparison with the search range based on the threshold value.

As a result, by the operator of the plant 100 having a good knowledge thereof setting the search range of FIGS. 5A through 5F, there can be obtained an advantage of operating the plant 100 safe even during the search operation of the optimum manipulation conditions.

According to the embodiment of the present invention described above, a control device for a plant capable of preferably maintaining the control characteristic of the plant even in the case in which the characteristic of the model for predicting the characteristic of the plant as a controlled object is different from the characteristic of the actual plant.

Second Embodiment

Then, a control device for a thermal power plant as a second embodiment of the present invention will be explained with reference to the accompanying drawings.

Figure 7:
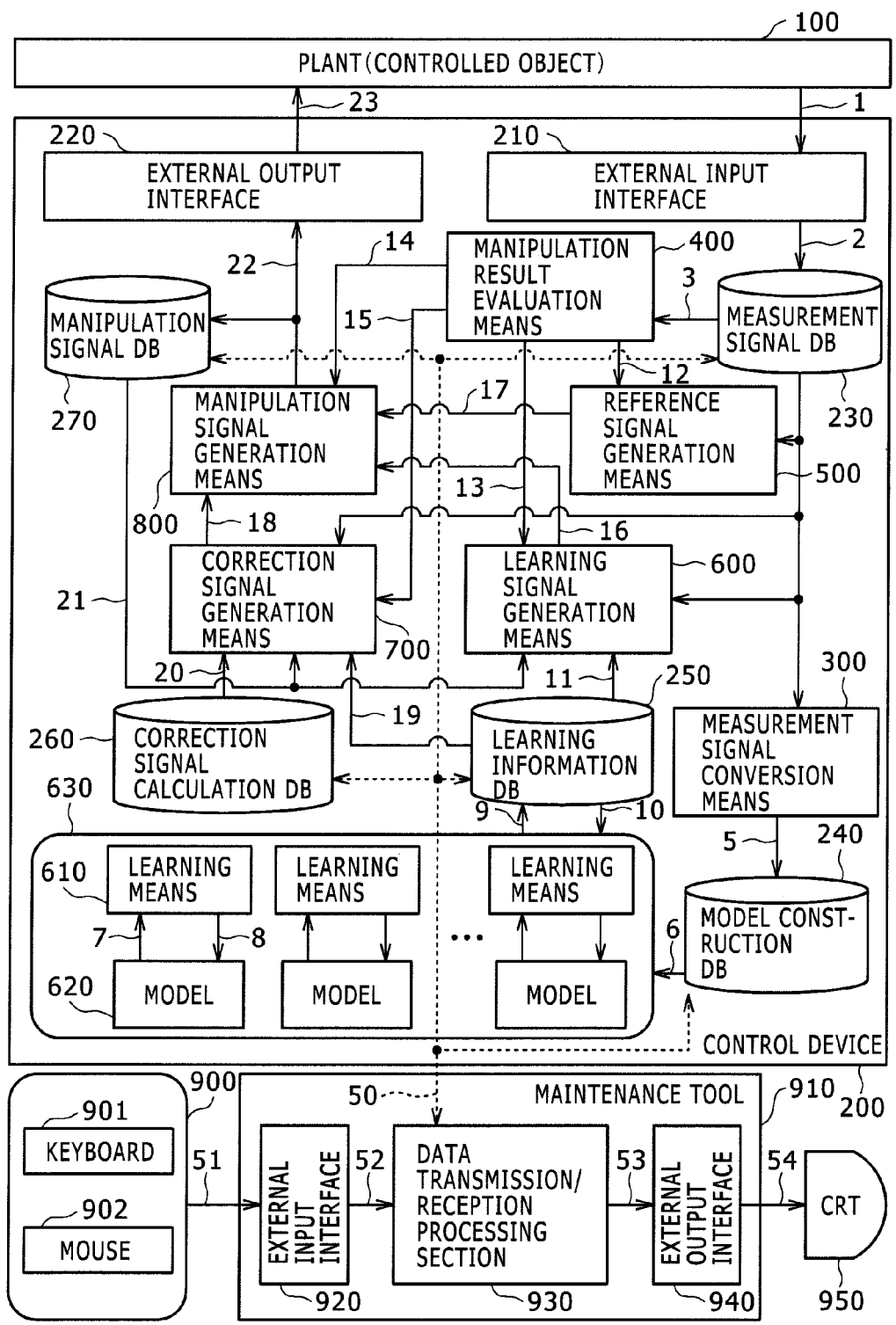
FIG. 7 is a control block diagram showing an overall configuration of a control device for a thermal power plant as a second embodiment of the invention.

FIG. 7 is a control block diagram showing an overall configuration of a control device for a thermal power plant as a second embodiment of the invention.

Further, FIGS. 8A and 8B described later show a schematic configuration of a thermal power plant equipped with a boiler using coal as the fuel as a thermal power plant to be the controlled object of the control device for a thermal power plant as the second embodiment of the present invention shown in FIG. 7.

Since the control device for a thermal power plant as the second embodiment shown in FIG. 7 has a basic configuration common to the control device for a plant as the first embodiment shown in FIG. 1, the explanation for the constituents common thereto will be omitted, and only the constitutions different therefrom will hereinafter be explained.

In the control device for a thermal power plant shown in FIG. 7, the thermal power plant 100a equipped with a boiler 101 using coal as the fuel is controlled by the control device 200.

The control device 200 of the present embodiment acquires the measurement signal 1 as a result of measuring various state variables of the thermal power plant 100a such as the oxygen concentration or the carbon monoxide concentration of the combustion gas at the exit of the boiler 101, and further, the control device 200 outputs the manipulation signal 23 for controlling, for example, a burner 102 of the boiler 101 and the air flow rate of the air port 103 to the thermal power plant 100a described above via the external output interface 220.

By performing control taking at least one of opening of an air damper, an air flow rate, a fuel flow rate, and an exhaust gas recirculation flow rate of the boiler 101 provided to the thermal power plant 100a as an object using the control device 200 of the present embodiment, it becomes possible to control at least one of the concentration of nitrogen oxide, the concentration of carbon monoxide, the concentration of carbon dioxide, the concentration of sulfur oxide, and the concentration of mercury included in the exhaust gas emitted from the thermal power plant 100a to a desired value.

The model 620 forming the control device 200 in the present embodiment is configured to input the model construction data 6 stored in the model construction database 240 such as the opening of an air damper, the air flow rate, the air temperature, the fuel flow rate, and the exhaust gas recirculation flow rate and execute predicting calculation to output the values of the concentration of nitrogen oxide, the concentration of carbon monoxide, the concentration of carbon dioxide, the concentration of sulfur oxide, and the concentration of mercury at that moment.

The control device for a thermal power plant as the second embodiment shown in FIG. 7 is different from the control device for a plant as the first embodiment shown in FIG. 1 in that there is provided a plurality of learning means 610 and models 620 to the control device 200 of the second embodiment shown in FIG. 7.

The control device 200 of the present embodiment is provided with a plurality of learning means 610 and models 620 as described above, thereby coping with switching of the operation conditions of the thermal power plant 100a.

In the thermal power plant 100a, when executing the operation of changing a burner pattern, a load level, or a coal type, the plant characteristic is changed dramatically.

As a method of keeping the operation condition of the thermal power plant 100a in a preferable state even in the case in which the plant characteristic has dramatically been changed, the control device 200 of the present embodiment is configured to be provided with a model switching means 630, in which a plurality of models 620 corresponding respectively to various types of operation conditions is prepared, and further a plurality of learning means 610 adapted to learn manipulation methods directed to the respective models 620 prepared corresponding respectively to the various types of operation conditions is also disposed.

Further, the number of the types of the learning information data 9 obtained by the respective learning means 610 prepared directed to the models 620 provided for the respective operation conditions in the present embodiment corresponds to the number of types of the models 620.

Further, the learning results obtained by the learning in the respective learning means 610 are stored in the learning information database 250.

Further, determination of which learning result is used when the leaning signal generation means 600 generates the learning signal 16, namely discrimination of the present operation condition of the plant, is performed by the manipulation result evaluation means 400.

Figure 8A:
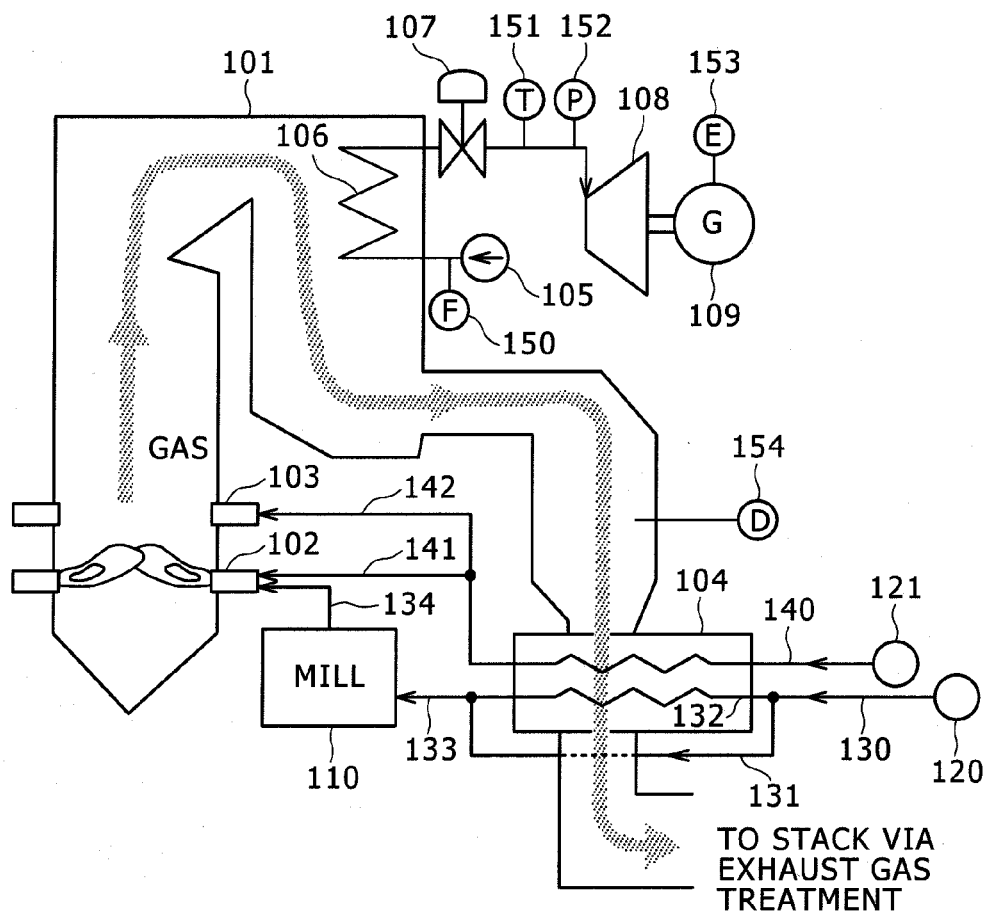
FIGS. 8A and 8B are schematic configuration diagrams showing an overall configuration of the thermal power plant as the second embodiment shown in FIG. 7.
Figure 8B:
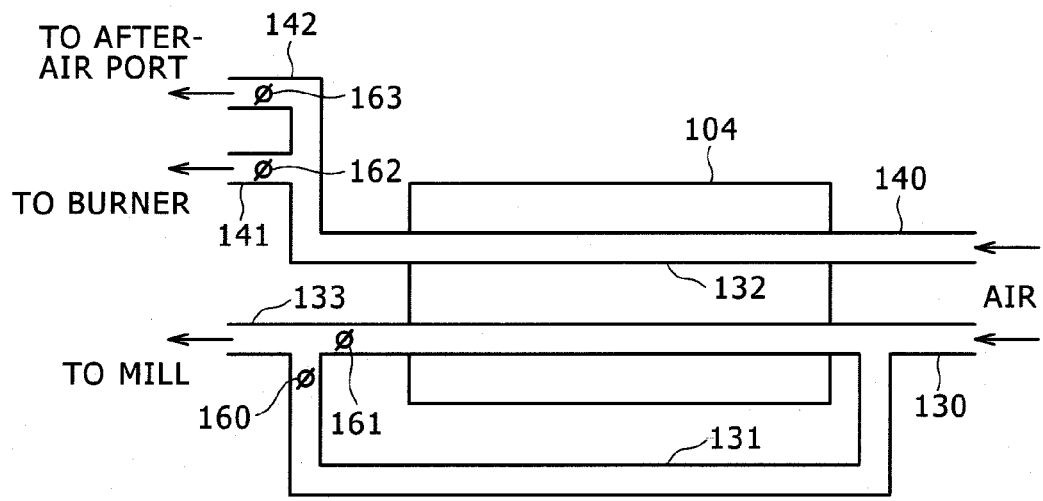

FIGS. 8A and 8B show a schematic configuration of a thermal power plant equipped with a boiler using coal as the fuel to be the controlled object of the control device for a thermal power plant as the second embodiment of the present invention shown in FIG. 7.

Firstly, a configuration of electric power generation of the thermal power plant 100a equipped with the boiler 101 will be explained with reference to FIG. 8A.

In FIG. 8A, the coal to be the fuel is pulverized by the mill into pulverized coal and fed into the boiler 101 together with primary air for carrying the coal and secondary air for combustion control via the burners 102 provided to the boiler 101, and is burnt as the fuel inside a furnace of the boiler 101.

The fuel coal and the primary air is introduced to the burner 102 via a pipe 134, and the secondary air is introduced there via a pipe 141.

Further, after air for two-stage combustion is fed into the boiler 101 via after-air ports 103 provided to the boiler 101. The after air is introduced to the after-air ports 103 from a pipe 142.

A hot combustion gas generated by burning the fuel coal inside the furnace of the boiler 101 flows in the furnace of the boiler 101 along a path indicated by the arrow towards a downstream side, passes through a heat exchanger 106 provided to the boiler 101 to be heat-exchanged, and then is emitted from the boiler 101 as a combustion exhaust gas to flow down to an air heater 104 disposed outside the boiler 101.

After the combustion exhaust gas passes through the air heater 104, harmful materials included in the combustion exhaust gas are removed by a gas treatment device, not shown, and then, the combustion exhaust gas is vented to the air from a stack.

Water supply circulating the boiler 101 is introduced in the boiler 101 via a water supply pump 105 from a condenser, not shown, provided to a turbine 108, and heated by the combustion exhaust gas flowing down inside the furnace of the boiler 101 in the heat exchanger provided to the furnace of the boiler 101 to be a high-temperature and pressure steam.

It should be noted that although in the present embodiment, the drawing is made assuming that the number of the heat exchangers 106 is one, it is also possible to dispose a plurality of heat exchangers.

The high-temperature and pressure steam generated in the heat exchanger 106 is introduced into the steam turbine 108 via a turbine governor valve 107 to drive the steam turbine 108 with the energy the steam have, and rotates the generator 109 coupled to the steam turbine 108 to generate electric power.

Then, channels of the primary and the secondary air fed into the furnace of the boiler 101 from the burners 102 provided to the furnace of the boiler 101, and the after air fed into the furnace of the boiler 101 from the after-air ports 103 provided to the furnace of the boiler 101 will be explained.

The primary air is introduced from a fan 120 to a pipe 130, branched in midstream into a pipe 132 passing through the air heater 104 and a pipe bypassing the air heater 104, and flows down the pipes 132 and 131. Then the primary air flows into each other again at a pipe 133, and is guided into the mill 110.

The air passing through the air heater 104 is heated by the combustion exhaust gas emitted from the furnace of the boiler 101.

The coal (the pulverized coal) generated by the mill 110 is carried using the primary air to the burner 102 via the pipe 133.

It is arranged that the secondary air and the after air are introduced into a pipe from a fan 121, heated while flowing down the pipe 140 passing through the air heater 104, then, branched at the downstream side of the pipe 140 into a pipe 141 for the secondary air and a pipe 142 for the after air, and introduced respectively into the burners 102 and the after-air ports 103 provided to the furnace of the boiler 101.

The control device 200 of the thermal power plant 100a equipped with the boiler as the present embodiment has a function of controlling an amount of air fed from the burners 102 into the boiler 101 and an amount of air fed from the after-air ports 103 into the boiler 101 in order for reducing the concentrations of NOx and CO in the exhaust gas of the boiler.

The thermal power plant 100a is provided with a variety of kinds of measurement equipment for detecting the operation conditions of the thermal power plant 100a, and the measurement signals of the plant acquired from the measurement equipment are transmitted to the control device 200 as the measurement signal 1.

As the a variety of types of measurement equipment for detecting the operation conditions of the thermal power plant 100a, there are illustrated in FIG. 8A, for example, a flow meter 150, a thermometer 151, a pressure meter 152, a power generation output meter 153, and a concentration meter 154 for measuring the concentration of $O_2$, the concentration of CO, or both of the concentrations of $O_2$ and CO.

The low meter 150 measures the flow rate of the water supply supplied from the water supply pump 105 to the boiler 101. Further, the thermometer 151 and the pressure meter 152 respectively measure the temperature and the pressure of the steam generated by the heat-exchange with the combustion exhaust gas flowing down the boiler 101 in the heat exchanger 106 provided to the boiler 101 and supplied to the steam turbine 108.

The electric energy generated by the generator 109 rotated by the steam turbine 108 driven by the steam generated by the heat exchanger 106 is measured by the power generation output meter 153.

Further, the information regarding the concentrations of the components (e.g., CO, NOx) included in the combustion exhaust gas flowing down the boiler 101 is measured by the a concentration meter 154 for measuring the concentration of $O_2$, the concentration of CO, or both of the concentrations of $O_2$ and CO disposed on the channel at the exit of the boiler on the downstream side of the boiler 101.

It should be noted that although the thermal power plant 100a is generally provided with a number of pieces of measurement equipment besides those shown in FIG. 8A, illustration thereof will be omitted here.

FIG. 8B is a partial enlarged view showing the air heater 104 disposed on the downstream side of the boiler 101 forming the thermal power plant 100a, and the pipes provided to the air heater 104.

As shown in FIG. 8B, the pipe 141 for the secondary air and the pipe 142 for the after air branched from the pipe 140 disposed inside the air heater 104 on the downstream side thereof, the pipe 132 disposed inside the air heater 104, and the pipe 131 bypassing the air heater 104 are provided respectively with the dampers 162, 163, 161, and 160.

Further, by manipulating these dampers 160 through 163, the areas of the pipes 131, 132, 141, and 142 through which the air passes are varied, and the rate of the airflow passing through each of the pipes 131, 132, 141, and 142 is controlled individually.

Further, using the manipulation signal 18 generated by the control device 200 for controlling the thermal power plant 100a and output to the thermal power plant 100a, devices such as the water supply pump 105, the mill 110, and the air dampers 160, 161, 162, and 163 are manipulated.

It should be noted that in the control device for the thermal power plant as the present embodiment, the devices for controlling the state variables of the thermal power plant such as the water supply pump 105, the mill 110, and the air dampers 160, 161, 162, and 163 are referred to as manipulation terminals, and the command signals necessary to control the manipulation terminals are referred to as manipulation signals.

Further, it is also possible to add a function capable of moving the discharge angle of the air for combustion and so on or the fuel such as the pulverized coal to left, right, up, and down when feeding the air and the fuel into the boiler 101 to the burners 102 and the after-air ports 103, and to include the command signals for controlling the attachment angles of the burners 102 and the after-air ports 103 in the manipulation signals 18 described above.

Then, the discrimination method of the plant operation conditions by the manipulation result evaluation means 400 provided to the control device 200 of the present embodiment will be explained with reference to FIG. 9A through 9C.

In FIGS. 9A through 9C, the manipulation result evaluation means 400 has a function of figuring out the burner pattern of the boiler based on the value of the measurement signal of flow rate of the coal supplied to the mill 110, a function of figuring out the load level based on the output demand or the value of the measurement signal of the output of the generator 109, and a function of figuring out the coal type based on the value of the measurement signal of a rotational frequency of a mill classification machine.

FIG. 9A is a diagram for explaining the function of figuring out the burner pattern of the boiler 101 by the manipulation result evaluation means 400.

At time t1 on the horizontal axis representing time, as shown on the vertical axis representing coal flow rate, mills A, B, and D forming the mill 110 supply the coal, and supply of the coal from mill C starts from a boundary of time t2 (e.g., at time t3, the coal is supplied from all of the mills A, B, C, and D).

As illustrated in the schematic diagram of the boiler shown in the right of the FIG. 9A, each of the mills A, B, C, and D supplies five burners disposed along the horizontal direction on the furnace front or the furnace rear of the boiler 101 with the coal.

The manipulation result evaluation means 400 can figure out the burner pattern from the amounts of coal supplied respectively from the mills A, B, C, and D shown in FIG. 9A, which are detected as the measurement signal 3 of the thermal power plant 100a via the measurement signal database 230, and a correspondence between the mills A, B, C, and D and the five burners provided to the boiler 101.

By figuring out the burner pattern described above, it becomes possible to figure out the combustion condition inside the furnace of the boiler 101.

FIG. 9B is a diagram for explaining the function of figuring out the load level of the thermal power plant 100a by the manipulation result evaluation means 400.

The generator output is obtained by measuring the amount of power generation of the generator 109 by the power generation output meter shown in FIG. 8A, and FIG. 9B shows that at time t4 on the horizontal axis representing time, the amount of the generator output of the thermal power plant 100a represented by the vertical axis is M4, and at time t5, the amount of the generator output is M5.

As described above, the load level of the thermal power plant 100a can be figured out based on the value of the measurement signal of the generator output measured by the power generation output meter 153.

FIG. 9C is a diagram for explaining a first coal type discrimination method used for the fuel of the boiler 101 of the thermal power plant 100a by the manipulation result evaluation means 400.

Regarding the mill classification machine for supplying the boiler 101 with the pulverized coal obtained by pulverizing the fuel coal provided to the mill 110 of the thermal power plant shown in FIG. 8A, FIG. 9C shows that at time t6 on the horizontal axis representing time, the rotational frequency represented by the vertical axis is R6, and at time t7, the rotational frequency is R7.

The rotational frequency is controlled so that the grain size of the pulverized coal as the fuel supplied to the boiler 101 from the mill 110 becomes a target value.

Since the hardness of coal is different between the coal types, the rotational frequency of the classification machine when the grain size of the pulverized coal matches the target value should be different between the coal types.

Therefore, the coal type of the coal supplied to the boiler 101 can be discriminated based on the rotational frequency of the classification machine.

The learning signal generation means 600 of the control device 200 generates the learning signal 16 under the following procedure.

Firstly, the manipulation result evaluation means 400 generates the flag 13 corresponding to the plant operation conditions determined by the function of figuring out the burner pattern based on the measurement signal 3 of the thermal power plant 100a obtained via the measurement signal database 230, the function of figuring out the load level based thereon, and the function of figuring out the coal type based thereon, and outputs the flag 13 to the learning signal generation means 600.

The model 620, using the model 620 corresponding to the plant operation conditions determined by the manipulation result evaluation means 400, makes the leaning means 610 corresponding to this model 620 generate the learning information data 9 obtained by learning and output it to the learning signal generation means 600 as the learning information data 11 via the learning information database 250.

The learning signal generation means 600 is configured to generate the learning signal 16 by calculation based on the flag 13 and the learning information data 11, and to output the learning signal 16 to the manipulation signal generation means 800.

Figure 10A:
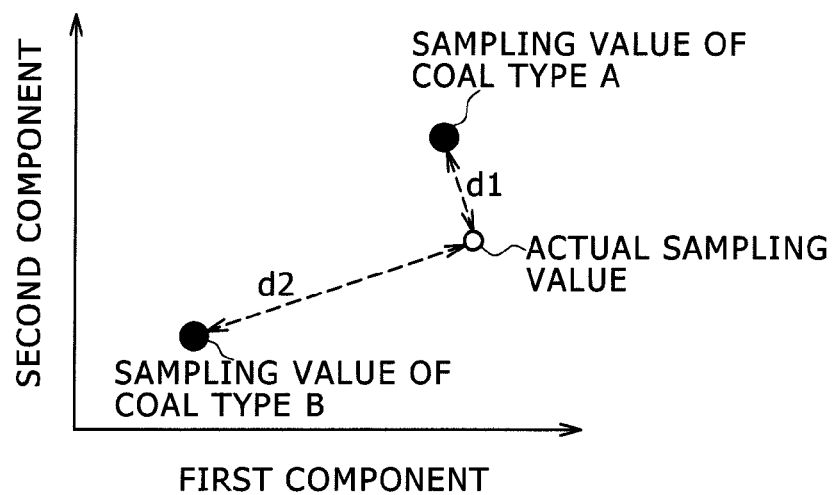
FIGS. 10A and 10B are explanatory diagrams showing a coal type discrimination method by the manipulation result evaluation means 400 in the control device for a thermal power plant as the second embodiment shown in FIG. 7.
Figure 10B:
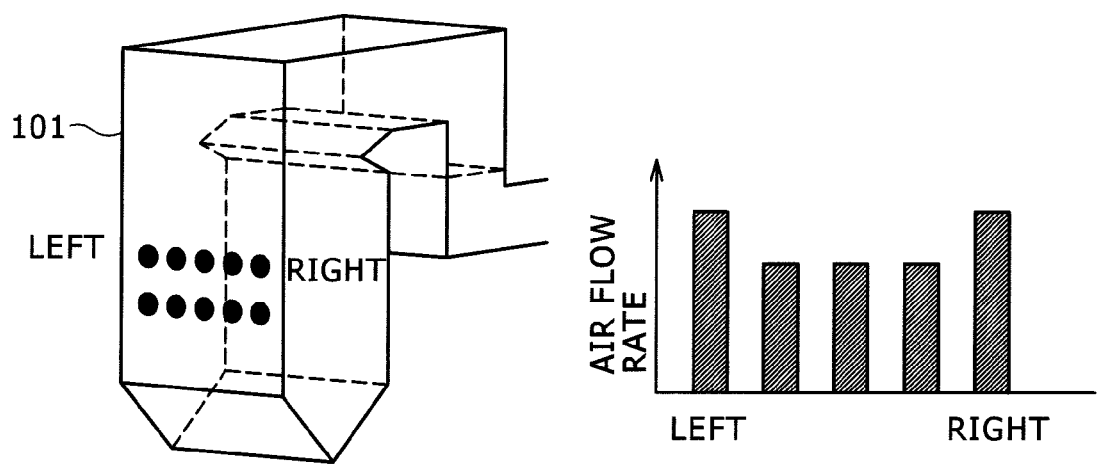

FIGS. 10A and 10B are diagrams for explaining a second coal type discrimination method in the manipulation result evaluation means 400 provided to the control device 200 of the present embodiment.

In FIG. 10A, the manipulation result evaluation means 400 calculates the weight between the plurality of models 620 prepared correspondingly to the various operation conditions in the model switching means 630 based on information of coal composition, the correction signal generation means 700 looks up the weight value of the model 620 thus calculated and the learning result of the learning means 610 to generate the correction signal 18 using a formula 9 provided to the correction signal generation means 700 as an operational function.

Here, i satisfies 1.Itoreq.i.Itoreq.n, n denotes the number of coal types, di denotes the distance between the ith coal and the actual sample value, and Si denotes the value of the learning signal generated along the learning result using the ith coal model.

The formula 9 means that the value obtained by adding all of the values (Si/di) within the range of 1.Itoreq.i.Itoreq.n is divided by the value obtained by adding all of the values (1/di) within the range of 1.Itoreq.i.Itoreq.n.

$$So=.SIGMA.(Si/di)/.SIGMA.(1/di) \qquad (9)$$

It should be noted that the distance di is obtained using the calculation algorithm of Euclidean distance and Mahalanobis distance.

In the drawing of a first component and a second component shown in FIG. 10A, the actual sample value as the object of the coal type discrimination has heavier weight of a sample value of a coal type A than weight of a sample value of a coal type B by taking the inverses of the distance d1 from the sample value of the coal type A and the distance d2 from the sample value of the coal type B as the weight thereof in view of the relationship between the distances d1, d2.

Therefore, by executing calculation on the models 620 with the respective weight values attached thereto, the manipulation result evaluation means 400 can determines the coal type of the actual sample.

Further, as illustrated in the schematic diagram of the boiler shown in the left of FIG. 10B, in the case in which the coal containing more sulfur content than a threshold value is used as the fuel of the boiler 101, the correction signal generation means 700 generates the correction signal 18 so as to increase the values of the flow rates of the air supplied from the burners and the air ports on the furnace wall of the boiler 101, and outputs the correction signal 18 to the manipulation signal generation means 800.

The manipulation signal generation means 800 generates the manipulation signal 22 based on the correction signal 18, and outputs the manipulation signal 22 via the external output interface 220 as the manipulation signal 23 to the thermal power plant 100a for performing the control.

It should be noted that the graph of the air flow rate shown in the right of FIG. 10B schematically shows the state of the flow rates of air supplied from the burners and air ports on the furnace wall illustrated in the schematic diagrams of the boiler shown in the left of FIG. 10B.

In particular in the case of using the coal with much sulfur content as the fuel, it becomes important to control the air flow rate so as to prevent the corrosion of the furnace wall of the boiler 101.

Further, as shown in FIG. 10B, in the case of using the coal with much sulfur content as the fuel of the boiler 101, the control device 200 of the present embodiment can prevent the corrosion of the furnace wall along the furnace wall from the burners 102 and the air ports 103 disposed on the furnace wall of the boiler 101 by generating the correction signal 18 in the correction signal generation means 700 so as to increase the air flow rate on the furnace wall of the boiler 101.

FIGS. 11A through 11D are explanatory diagrams for explaining the operation of the control device 200 in the control device for a thermal power plant as the second embodiment of the present invention shown in FIGS. 7, 8A, and 8B.

FIG. 11A is a diagram showing an example of the characteristic of the model 620 provided to the control device 200 of the present embodiment, and the learning means 610 provided corresponding to the model 620 learns the manipulation condition with which the concentration of CO is minimized using the model 620 as an object.

For example, by using the reinforcement learning when implementing the learning means 610 in the control device 200, and setting it so that the lower the CO concentration is, the greater the reward becomes, it is possible to learn the manipulation method of achieving the manipulation condition (the manipulation condition y shown in FIG. 11A) with which the CO concentration becomes the minimum.

As showing the relationship between the manipulation condition represented by the horizontal axis and the CO concentration represented by the vertical axis in FIG. 11A, the variation in the CO concentration with respect to the variation in the manipulation condition is large in the vicinity of the manipulating condition y.

In the case in which the air flow rate is the manipulation condition, since the flow rate of the air fed into the boiler 101 varies temporally, even if the manipulation signal is matched with the manipulation condition y, there is a possibility that the flow rate of the air actually fed into the boiler varies to increase the CO concentration.

In order for avoiding such a phenomenon, the control device 200 of the present embodiment can adopt the method described below when operating the learning means 610.

Specifically, the reinforcement learning is adopted when implementing the learning means 610 in the control device 200, and the reward obtained by adding a first reward, which becomes the greater when the CO concentration is the lower, and a second reward, which takes a negative value when a formula 10 provided to the learning means 610 as an operational function is satisfied, is used.

It should be noted that in the formula 10, CO(I) denotes an estimated value (a model output) of the CO concentration with the manipulation condition of I, .DELTA. denotes a minute value, and .OMEGA. denotes a predetermined threshold value.

$$ABS(CO(I)-CO(I+.DELTA.))/.DELTA.>.OMEGA. \quad (10)$$

By adopting the reward described above to the learning means 610, it is possible to learn the manipulation method achieving the manipulation condition (the manipulation condition x shown in FIG. 11A) with which the CO concentration becomes the minimum under the condition with a low rate of variation in the CO concentration.

This makes a contribution to a safe operation in the case of controlling the thermal power plant 100a.

FIG. 11B shows an embodiment (a control circuit) of the manipulation signal generation means 800 provided to the control device 200 in the present embodiment having the thermal power plant 100a as the controlled object.

As shown in the control circuit of FIG. 11B, in order for making the oxygen concentration at the exit of the boiler become a desired value, the control circuit forming the manipulation signal generation means 800 generates the manipulation signal related to the air flow rate by adding the output signal of a PI controller having the deviation between the measurement value of the oxygen concentration and the target value thereof as the input and the setting value of the air flow rate to each other.

Further, the manipulation signal generation means 800 determines the total air flow rate to be fed into the boiler 101 by calculation based on the manipulation signal of the air flow rate thus generated, and outputs the result as the manipulation signal.

Further, the correction signal 18 generated by the correction signal generation means 700 and input to the manipulation signal generation means 800 is reflected so as to input to the positions indicated as the correction signal a and the correction signal b in the control circuit forming the manipulation signal generation means 800 shown in FIG. 11B, for example.

Specifically, the correction signal a and the correction signal b are input respectively as the correction signal a for correcting the target value of the oxygen concentration and the correction signal b for correcting the air flow rate manipulation signal.

Further, FIG. 11C shows an example of a method of generating the correction signal 18 in the correction signal generation means 700 provided to the control device 200 in the present embodiment.

As shown in FIG. 11C, the correction signal generation means 700 generates the correction signal 18 based on features of errors between the model characteristics of the models 620 and the actual equipment data of the thermal power plant 100a as the controlled object.

Specifically, the correction signal generation means 700 estimates causes of the errors based on the features of the errors between the model characteristics of the models 620 and the actual equipment data of the thermal power plant 100a, and generates the correction signal 18 based on the causes of the errors.

As the causes of the errors, there can be cited those caused by the momentum control of the air fed into the furnace of the boiler 101 from the after-air ports 103 provided to the furnace wall of the boiler 101.

Therefore, the momentum control of the air fed into the furnace from the after-air ports 103 will be described.

FIG. 11D is a schematic structural diagram of the after-air port provided to the furnace wall of the boiler 101 in the present embodiment.

In FIG. 11D, the air supplied to the after-airport 103 is supplied into the furnace via a nozzle 181, 182 of the after-air port 103.

The distribution of the air supplied from the nozzle 181, 182 into the furnace can be changed by respectively operating the air dampers 163a, 163b forming a part of the air damper 163 shown in FIG. 8B.

Specifically, in FIG. 11D, when the position of the air damper 163B moves rightward, the channel in the air damper 163b is narrowed, and therefore, the flow rate of the air supplied from the nozzle 182 into the furnace is reduced.

In the thermal power plant 100a, the flow rate, the flow velocity, and momentum of the air fed into the furnace from the after-air port are controlled by operating the air dampers 163a, 163b of the after-air port as described above.

The opening of each of the air dampers 163a, 163b of the after-air port 103 is manually manipulated to be a setting value.

Further, there is a possibility of causing an error between the air flow rate of the setting value and the air flow rate obtained as a manipulation result in the target air flow rate and the flow rate of the air actually fed into the boiler 101.

Therefore, the model 620 of the control device 200 is configured to predict the carbon monoxide concentration and so on in the combustion exhaust gas emitted from the boiler 101 in the present setting values based on the setting values of the opening of the air dampers 163a, 163b.

Therefore, as described above, in the case in which an error is caused between the setting value of the flow rate of the air fed into the boiler 101 and the air flow rate obtained as the manipulation result, there is a possibility that the predicted value of the model 620 and the measurement value as the state variable of the thermal power plant 100a do not match each other.

Therefore, the control device 200 of the present embodiment is configured that in the case in which the predicted value of the model and the measurement value from the thermal power plant 100a do not match each other, the correction signal generation means 700 generates the correction signal 18 for correcting the opening of the air dampers 163a, 163b of the after-air port 103 so as to eliminate the error between the setting value of the flow rate of the air fed into the boiler 101 and the air flow rate obtained as the manipulation result, and input the correction signal 18 to the manipulation signal generation means 800, and the manipulation signal generation means 800 then generates the manipulation signal 22.

Further, it is also possible to display the value of the manipulation signal 18 on the image display device 950 shown in FIG. 7 as a manipulation guidance value to be learned by the operator of the thermal power plant 100a.

As described above, by controlling the opening of the air dampers 163a, 163b of the after-air port 103 using the control device 200 of the present embodiment, it is possible to control the concentration of nitrogen oxide, carbon monoxide, carbon dioxide, sulfur oxide, or mercury contained in the combustion exhaust gas emitted from the boiler to a desired value.

It should be noted that although the case in which the control device 200 controls the flow rate, the flow speed, the momentum, and so on of the air fed into the furnace from the after-air port 103 provided to the furnace wall of the boiler 101 is described in the present embodiment, it is also possible to apply the control device 200 to the control of the flow rate, the flow speed, the momentum, and so on of the air fed into the furnace from the burners 102 provided to the furnace wall of the boiler 101.

According to the embodiment of the present invention described above, a control device for a thermal power plant capable of preferably maintaining the control characteristic of the plant even in the case in which the characteristic of the model for predicting the characteristic of the plant as a controlled object is different from the characteristic of the actual plant.

Third Embodiment

A gas concentration estimation device of another embodiment is directed to a coal-burning boiler provided to a thermal power plant, and a gas concentration estimation device adapted to perform an estimation process of the gas concentrations of CO and NOx included in an exhaust gas emitted from the coal-burning boiler using a neural network.

Regarding the materials of CO and NOx included in the exhaust gas emitted from the coal-burning boiler, there are provided limit values in the concentration in the exhaust gas based on the environmental restriction.

The gas concentration estimation device of a coal-burning boiler as the present embodiment is for estimating the concentration of CO and the concentration of NOx in the exhaust gas with respect to various operation conditions of the thermal power plant equipped with a coal-burning boiler.

A control system of a thermal power plant equipped with the coal-burning boiler of the present embodiment is for satisfying the environmental restriction on the exhaust gas, and at the same time, for planning the operation condition of the coal-burning boiler for maximizing the efficiency of the boiler based on the estimation values of the CO concentration and the NOx concentration corresponding to the various operation conditions (e.g., combustion flow rate and air flow rate) obtained from the gas concentration estimation device described above.

The gas concentration estimation device and a method thereof of the coal-burning boiler as the present embodiment will hereinafter be explained with reference to the accompanying drawings.

Figure 12:
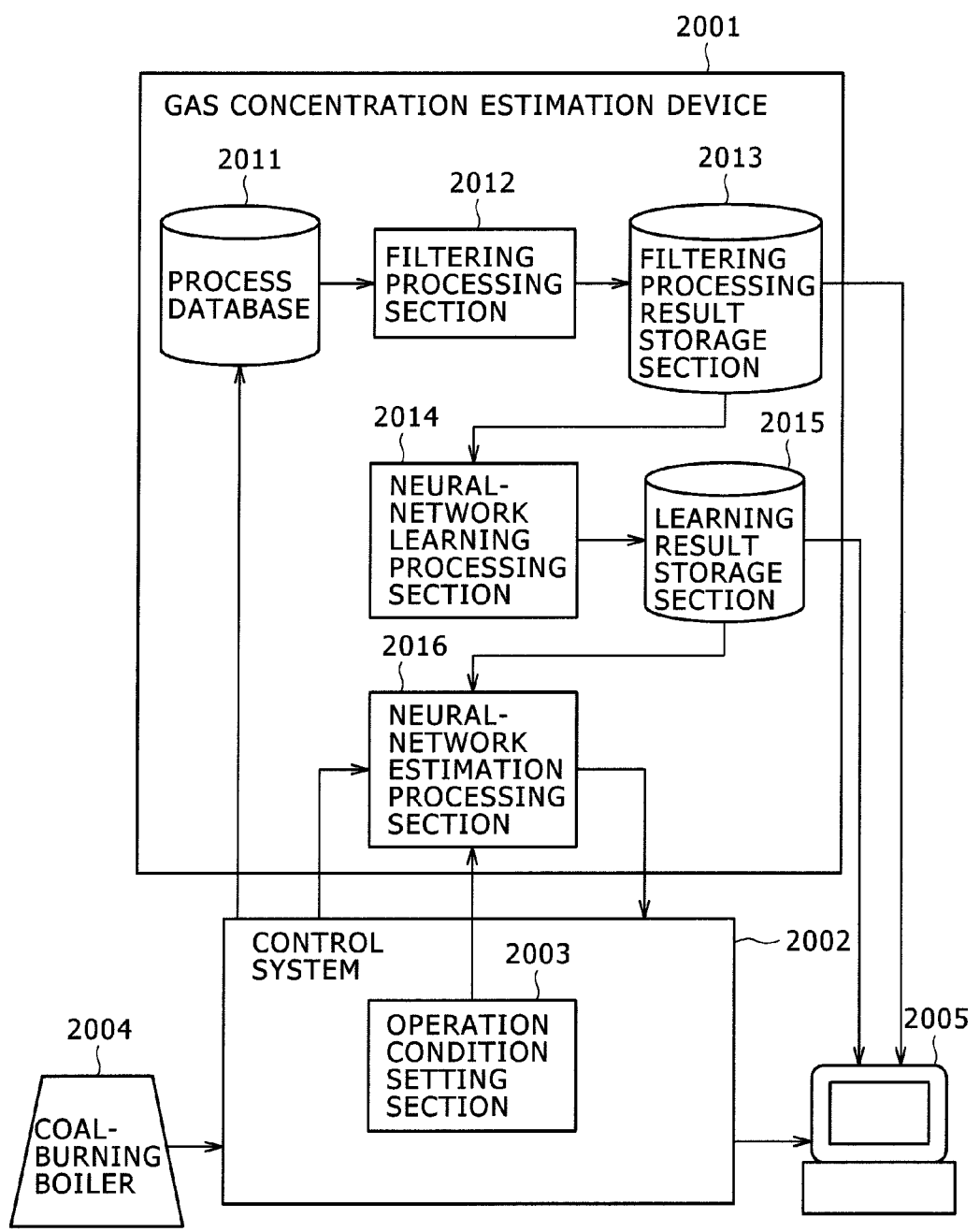
FIG. 12 is a schematic diagram showing a configuration of a gas concentration estimation device of a coal-burning boiler as an embodiment of the invention.

FIG. 12 is a schematic diagram showing a configuration of a gas concentration estimation device of a coal-burning boiler as an embodiment of the invention.

The combustion control of the coal-burning boiler 2004 as a plant shown in FIG. 12 is performed by a control system 2002. Further, as a gas concentration estimation device 2001 of the coal burning boiler 2004 shown in FIG. 12, there is provided a gas concentration estimation device 2001 adapted to estimate the CO concentration and the NOx concentration in the exhaust gas emitted from the coal-burning boiler 2004.

The gas concentration estimation device 2001 is provided with a process database (a process DB) 2011 for acquiring process data to be actual equipment data of the coal-burning boiler 2004 online via the control system 2002 and then storing the process data thus acquired in a time-series manner, a filtering processing section 2012 adapted to perform the filtering process for extracting data suitable for learning of a neural network from the process data stored in the process DB in a time-series manner, and a filtering processing result storage section 2013 for storing the result of the filtering processing by the filtering processing section 2012.

Further, the gas concentration estimation device 2001 described above is further provided with a neural-network learning processing section 2014 for performing the neural-network learning processing for estimating the CO concentration, the NOx concentration, or both of the CO concentration and the NOx concentration in the exhaust gas emitted from the coal-burning boiler 2004 based on the data suitable for the neural-network learning thus extracted by the filtering processing and stored in the filtering processing result storage section 2013, and a learning result storage section 2015 for storing coupling coefficients obtained in the learning processing by the neural-network learning processing section 2014.

Further, the gas concentration estimation device 2001 is further provided with a neural-network estimation processing section 2016 for performing the estimation processing of the CO concentration, the NOx concentration, or both of the CO concentration and the NOx concentration in the exhaust gas emitted from the coal-burning boiler 2004 described above based on the learning processing of the neural-network learning processing section 2014.

In the present embodiment of the invention, the coal-burning boiler 2004 as the controlled object is provided with the control system for performing the combustion control of the boiler, and it is configured that the control system 2002 sets the operation condition of the coal-burning boiler 2004 to the gas concentration estimation device 2001, and the gas concentration estimation device 2001 calculates the estimation values of the CO concentration and the NOx concentration in the operation condition.

The gas concentration estimation device 2001 uses the process data of the coal-burning boiler 2004 acquired via the control system 2002 when estimating the CO concentration and the NOx concentration of the coal-burning boiler 2004.

The process data of the coal-burning boiler 2004 acquired from the control system 2002 are stored to the process DB 2011 provided to the gas concentration estimation device 2001 and then stored therein in a time-series manner as described above.

Further, in the gas concentration estimation device 2001, then the filtering processing section 2012 obtains the process data of the coal-burning boiler 2004 stored in the process DB 2011 in a time-series manner, and performs the filtering processing for extracting only the process data suitable for the neural-network learning.

In the filtering processing of the present embodiment, the data to be an error of the model is eliminated out of the process data of the actual equipment of the coal-burning boiler 2004 used for building the model, and then the learning of the model is performed. The filtering of the data to be a cause of an error is performed as described below.

In general, there is a plurality of types of data used as input of the model. Firstly, attention is focused on one input signal out of these data, and a plurality of combinations of data is extracted, the data having approximately the same input signal values except the datum of the input signal on which attention is focused.

Regarding the plurality of combinations of data, a trend of the data with respect to the variation of the input signal on which attention is focused is examined. On this occasion, if there is any data deviating from the trend, the data is eliminated from the learning data under the judgment that the data becomes the cause of an error in the modeling. The processing described above is executed for every data type used as the input signal.

Then, the specific content of the filtering processing in the filtering processing section 2012 will be explained.

The filtering processing section 2012 obtains the input signals used as the inputs of the neural network and the measurement values corresponding to the CO concentration and the NOx concentration as the estimation objects out of the process data of the coal-burning boiler 2004 stored in the process DB 2011.

As the input signals of the neural network, there can be cited, for example, the primary air flow rate (primary air fan power or the like if the primary air flow rate is not measured) for combustion supplied to the coal-burning boiler 2004, the secondary air flow rate therefor, the load of the coal-burning boiler, and a flow rate of a coal feeder for supplying the fuel coal.

Attention is focused on one of these input signals, as a first step, and the filtering processing section 2012 performs grouping of the process data stored in the process DB 2011.

For example, in the case in which attention is focused on the signal of the coal feeder flow rate as the one of the signals in the first step, with respect to the signal values other than the coal feeder flow rate, the data having the difference within a predetermined threshold value range are defined as the same group.

In other words, in the case in which the signals other than the coal feeder flow rate are used as the input signals, the filtering processing section 2012 corrects and groups the data each having the signals of the primary air flow rate, the secondary air flow rate, and the boiler load showing approximately the same values within a predetermined value range although the value of the signal of the coal feeder flow rate is different.

Figure 13A:
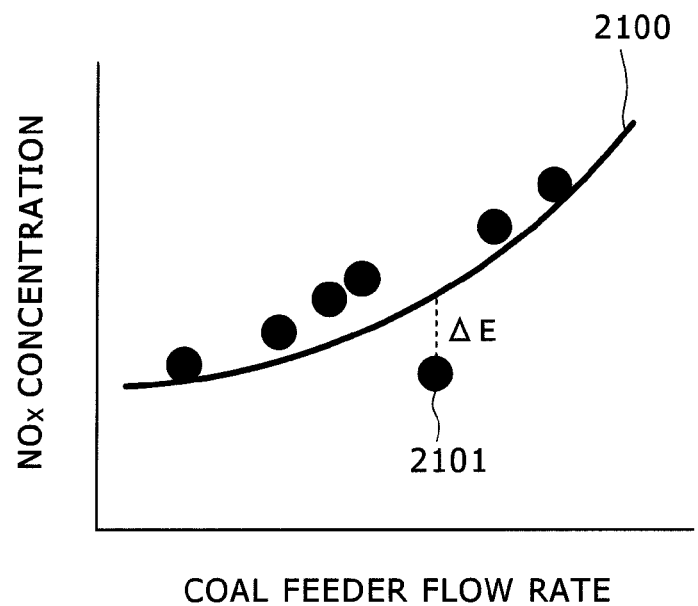
Figure 13B:
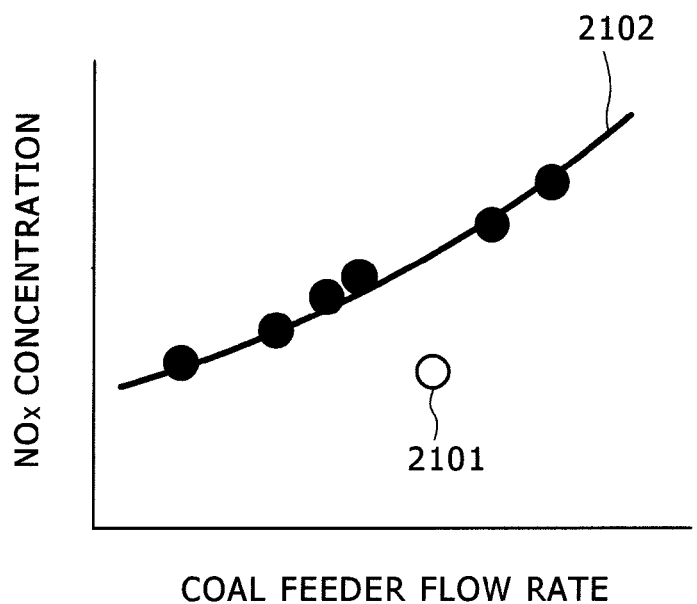

Then, with respect to each of the groups thus grouped as described above, the filtering processing section 2012 graphs the relationship between the coal feeder flow rate as the input signal and the CO concentration and the NOx concentration as the object of the gas concentration to be estimated. FIGS. 13A and 13B show the concept of this processing.

FIGS. 13A and 13B show the graphing processing performed by the filtering processing section 2012, and show the characteristic graphs obtained by plotting the data belonging to the same group assigning the coal feeder flow rate as the input signal to the horizontal axis and the NOx concentration as the object of the gas concentration to be estimated to the vertical axis.

Since the values of the signals other than the signal of the coal feeder flow rate are approximately the same values within the predetermined threshold value range as described above, it can be assumed that the signals other than the signal of the coal feeder flow rate are in the same conditions. In this case, the characteristic graphs show the dependency of the data on the coal feeder flow rate, namely the degree of relationship of influence exerted on the NOx concentration, and in the case shown in FIG. 13A, the degree of the relationship described above is large.

Subsequently, the filtering processing section 2012 executes function fitting on the data plotted of the FIGS. 13A and 13B.

The curved function 2100 illustrated in FIG. 13A shows the fitting function obtained by the fitting processing.

Subsequently, the filtering processing section 2012 calculates the error between the fitting function 2100 and each of the data plotted on the graph.

Further, in the calculation by the filtering processing section 2012, the data having the error exceeding a predetermined threshold value is judged to be the data including a large amount of error since the dependency on the coal feeder flow rate is different from those of the other data, and is eliminated from the data used for the modeling processing for learning the neural-network model in the neural-network learning processing section 2014 described later.

For example, in the case shown in FIG. 13A, if the error .DELTA.E of the data 2101 exceeds a predetermined threshold value with respect to the curved function 2100, it is judged that the error .DELTA.E included in the data 2101 is large, and the data 2101 is eliminated from the data to be used in the modeling processing.

Subsequently, as is the case shown in FIG. 13B, the fitting processing is executed again on the data not eliminated in the fitting processing by the filtering processing section 2012.

In the example of FIG. 13B, there is shown a situation in which the fitting processing is executed after eliminating the data 2101, and the curved fitting function 2102 is newly obtained.

Subsequently, the filtering processing section 2012 calculates the error between the new fitting function 2102 and each of the data plotted on the graph. Further, if there is any data with the error exceeding the predetermined threshold value, the data causing the error exceeding the predetermined threshold value is eliminated, and the fitting processing is executed again.

Further, if there is no data with the error exceeding the predetermined threshold value, the processing to this group is terminated. The same processing is executed on the other groups.

The processing explained above is executed with respect to each of the signals (the first air flow rate, the second air flow rate, and the boiler load besides the coal feeder flow rate in the example described above) set as the input signal to the neural-network model.

According to the filtering processing by the filtering processing section 2012 described above, the data having a large error and therefore becoming the cause of error in the model can be eliminated.

The result of the filtering processing by the filtering processing section 2012 is stored in the filtering processing result storage section 2013.

Subsequently, the neural-network learning processing section 2014 performs the learning processing of the neural network for estimating the CO concentration and the NOx concentration based on the data, on which the filtering processing has already executed, stored in the filtering processing result storage section 2013.

Figure 14:
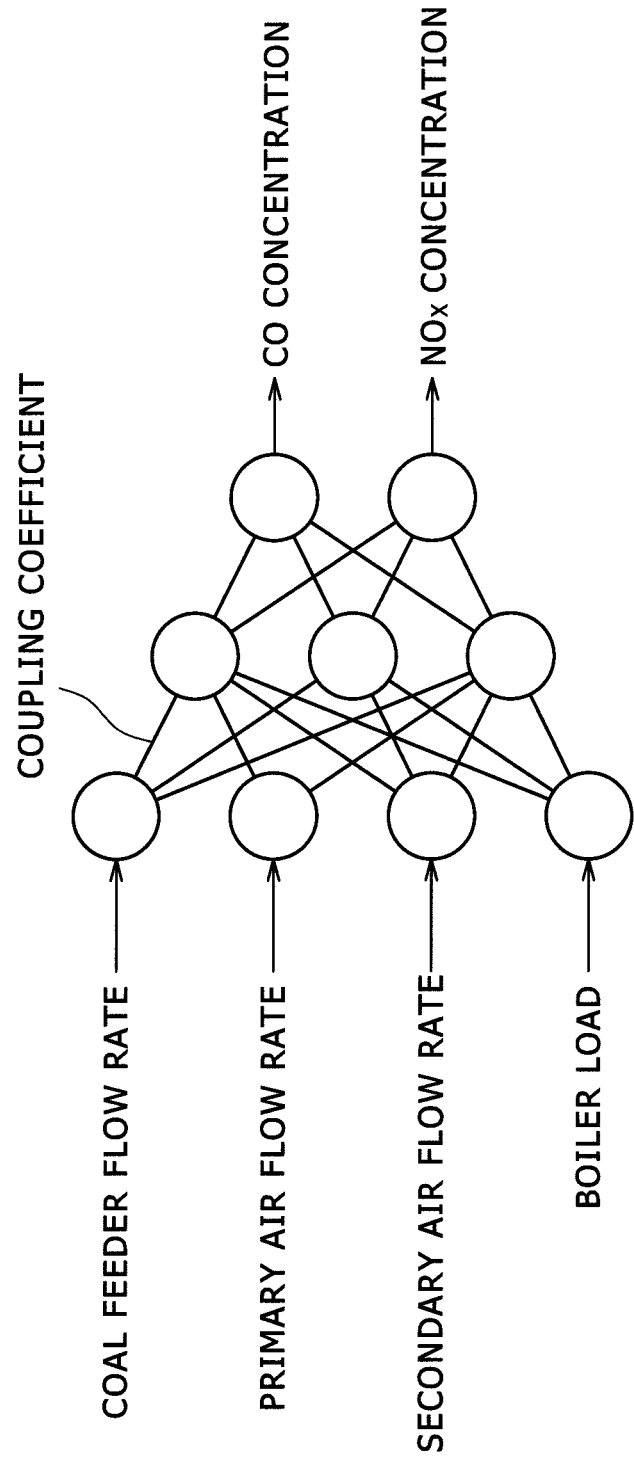
FIG. 14 is a schematic diagram showing an example of a configuration of a neural network in a neural-network learning processing section forming the gas concentration estimation device of the embodiment shown in FIG. 12.

FIG. 14 shows a configuration example of the neural network in the neural-network learning processing section 2014.

In the configuration example of the neural network forming the neural-network learning processing section 2014 shown in FIG. 14, the coal feeder flow rate, the primary air flow rate, the secondary air flow rate, and the boiler load as the process data of the coal-burning boiler 2004 are provided to the neural network as the input signals therefor, and the CO concentration and the NOx concentration in the exhaust gas emitted from the coal-burning boiler 2004 are set as the output signal of the neural network.

By the learning processing in the neural network forming the neural-network learning processing section 2014, the coupling coefficients representing the relationship between the input values and the output values on the neural network can be obtained.

The coupling coefficients obtained by the learning processing by the neural network in the neural-network learning processing section 2014 are stored in the learning result storage section 2015.

The explanations described above is the content of the learning processing building the neural-network model for estimating the gas concentration (the CO concentration, the NOx concentration, or both of the CO concentration and the NOx concentration) in the exhaust gas emitted from the coal-burning boiler 2004.

In the learning processing in the neural-network learning processing section 2014, if the measurement data of the coal-burning boiler 2004 in various operation conditions are stored in the process DB 2011, the real-time processing is not required.

Further, it is also possible that the learning processing described above is previously performed prior to executing the process for estimating the gas concentration (the CO concentration and the NOx concentration) in the neural-network estimation processing section 2016 described later, to prepare the neural-network model.

Then, the operation of the neural-network estimation processing section 2016 for estimating the concentration of the gas (the CO concentration, the NOx concentration, or both of the CO concentration and the NOx concentration) included in the exhaust gas of the coal-burning boiler 2004 using the neural-network model built by the learning processing of the neural-network learning processing section 2014 will be explained.

The control system 2002 of the thermal power plant 2004 equipped with the coal-burning boiler shown in FIG. 12 performs optimization of the combustion control of the coal-burning boiler 2004 in order for reducing the CO concentration, the NOx concentration, or both of the CO concentration and the NOx concentration as the concentration of the gas included in the exhaust gas of the coal-burning boiler 2004 and on which the environmental regulation values are set.

In the process of optimizing the combustion control, an operation condition setting section 2003 provided to the control system 2002 changes the process value corresponding to the control condition out of the process values set to the input of the neural network based on the command signal from the control system 2002.

For example, in the case of analyzing the trend of variation of the CO concentration or the NOx concentration in accordance with variation of the primary air flow rate, the operation condition setting section 2003 operates so as to change only the value of the primary air flow rate out of the input signals of the neural network and set the values of the other input signals (e.g., the coal feeder flow rate, the secondary air flow rate, and the boiler load) as they stands.

In this case, the control system 2002 determines the optimum control method of the boiler combustion in the coal-burning boiler based on the estimation values (in the example described above, the trend of variation in accordance with the primary air flow rate as the input signal can be found out) of the CO concentration or the NOx concentration obtained by the estimation processing of the neural-network estimation processing section 2016.

As the optimum control method of the boiler combustion, it is possible, for example, to perform combustion control of the boiler while controlling the combustion air flow rate or changing the combustion patterns of the boiler.

It is arranged that the result of the processing by the neural-network estimation processing section 2016 is displayed on the display device 2005 shown in FIG. 12 so that the result can be confirmed.

Figure 15A:
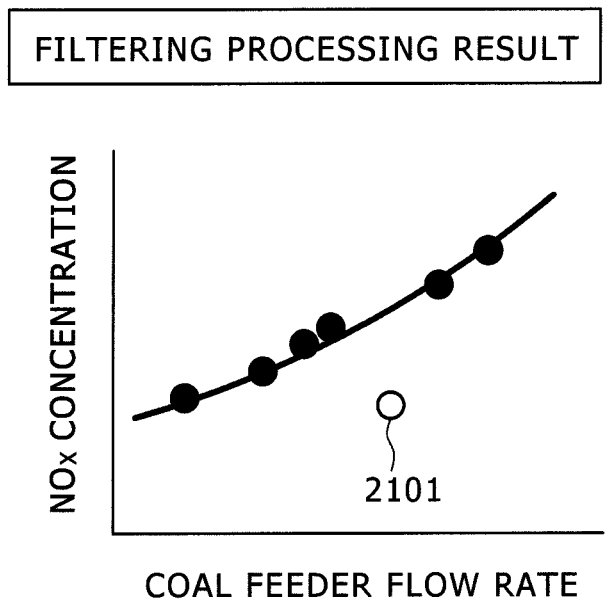
FIGS. 15A and 15B are schematic diagrams showing examples of display on a display device provided to the embodiment shown in FIG. 12.
Figure 15B:
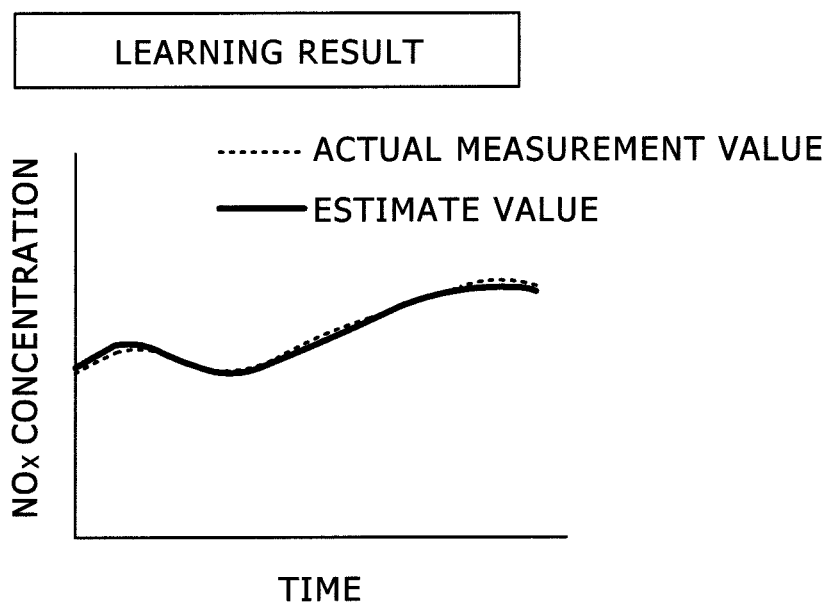

FIGS. 15A and 15B shows an example of display on the display device 2005 provided to the present embodiment shown in FIG. 12. The display example of the display device 2005 illustrated in FIG. 15A shows the data 2101 eliminated by the filtering processing of the filtering processing section 2012.

Further, in the display example of the display device 2005 shown in FIG. 15B, the estimated value of the neural-network model corresponding to the NOx concentration obtained by the learning processing of the neural-network estimation processing section 2016 of the present embodiment is illustrated with the dot line, and further, the trend of the estimation value of the NOx concentration corresponding to elapse of time is also displayed.

Further, in the display example shown in FIG. 15B, both of the actual measurement value of the NOx concentration illustrated with the solid line and the trend of the estimation value by the neural-network model illustrated with the dot line are displayed in a form of comparing the both values with each other.

According to the present embodiment described hereinabove, it become possible to perform the estimation processing of the CO concentration, the NOx concentration, or both of the CO concentration and the NOx concentration in the exhaust gas for optimizing the combustion control of the boiler by the control system with high accuracy.

Therefore, according to the embodiment of the present invention, there can be provided a gas concentration estimation device of a coal-burning boiler and a gas concentration estimation method each suppressing an estimation error of a neural-network model caused by a measurement error included in actual equipment data in the case in which the variation in the concentration of CO or the concentration of NOx in the exhaust gas is simulated using a neural network in combustion control of the coal-burning boiler, thereby making it possible to estimate the gas concentration with high accuracy.

The present invention as an embodiment can be applied to a control device for a plant and to a control device for a thermal power plant equipped with a boiler.

The present invention as another embodiment can be applied to a gas concentration estimation device and a gas concentration estimation method of estimating the concentration of CO or NOx as a gas component included in the exhaust gas emitted from a coal-burning boiler.

What is claimed is:

1. A gas concentration estimation method for a coal-burning boiler, adapted to estimate a concentration of a gas component emitted from a coal-burning boiler using a neural network comprising:
   (a) storing process data of the coal-burning boiler;
   (b) performing filtering processing for extracting data suitable for learning of a neural network, from the process data stored;
   (c) performing learning processing of the neural network based on the data which is extracted in (b) and suitable for learning of the neural network; and
   (d) performing estimation processing of one of the CO concentration and the NOx concentration in an exhaust gas emitted from the coal-burning boiler, based on the learning processing of the neural-network;
   wherein (b) includes:
   (b1) specifying error data within the data, which includes a substantial error with respect to the data used for learning of the neural network, based on a trend of a variation to signals used as input signals of the neural network, and
   (b2) filtering the specified error data to eliminate the error data from the data used in the learning processing of the neural network;
   (b3) extracting the process data having input signals including one reference input signal and the other input signals, where each of the other input signals having a value within a predetermined threshold value range and each of the values are close to each other, to make a group, with respect to the process data used for learning of the neural network and having signals used as input signals of the neural network,
   (b4) obtaining a function of fitting the relationship between the reference input signal and a gas concentration signal value as the estimation object, both included in the process data belonging to the same group, and
   (b5) specifying the data to be eliminated based on the difference between the value of the function thus fitted and the signal value of one of the CO concentration and the NOx concentration as the estimation object.

2. The gas concentration estimation method according to claim 1, further comprising:
   (e) displaying, on a display device, the data belonging to the same group, the function obtained in step (b4), and the data eliminated.

3. A gas concentration estimation method for a coal-burning boiler, adapted to estimate a concentration of a gas component emitted from a coal-burning boiler using a neural network, comprising:
   (a) storing process data of the coal-burning boiler;
   (b) performing filtering processing for extracting data suitable for learning of a neural network, from the process data stored;
   (c) performing learning processing of the neural network based on the data which is extracted in (b) and suitable for learning of the neural network; and
   (d) performing estimation processing of one of the CO concentration and the NOx concentration in an exhaust gas emitted from the coal-burning boiler, based on the learning processing of the neural-network;
   wherein (b) includes performing filtering processing prior to a neural-network learning process, for extracting data suitable for learning of a neural network, from the process data stored in the process database section, where the filtering processing eliminating error data from the data, which exceeds a predetermined threshold variation from a trend shown by the data.

* * * * *